(12) United States Patent
Onishi et al.

(10) Patent No.: US 8,001,450 B2
(45) Date of Patent: Aug. 16, 2011

(54) SEMICONDUCTOR MEMORY DEVICE CAPABLE OF CHANGING ECC CODE LENGTH

(75) Inventors: Yasuhiro Onishi, Kawasaki (JP); Toshiya Miyo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1053 days.

(21) Appl. No.: 11/878,867

(22) Filed: Jul. 27, 2007

(65) Prior Publication Data

US 2008/0034270 A1 Feb. 7, 2008

(30) Foreign Application Priority Data

Aug. 7, 2006 (JP) .................................. 2006-214080

(51) Int. Cl.
*H03M 13/00* (2006.01)

(52) U.S. Cl. ......... 714/785; 714/752; 714/758; 714/769

(58) Field of Classification Search ................... 714/752, 714/758, 769, 785

See application file for complete search history.

(56) References Cited

U.S. PATENT DOCUMENTS

| | | | |
|---|---|---|---|
| 3,836,957 A | 9/1974 | Duke et al. | |
| 4,404,673 A | 9/1983 | Yamanouchi | |
| 6,678,860 B1 | 1/2004 | Lee | |
| 7,739,576 B2 * | 6/2010 | Radke | 714/758 |
| 7,810,017 B2 * | 10/2010 | Radke | 714/769 |
| 2004/0243887 A1 * | 12/2004 | Sharma et al. | 714/52 |

FOREIGN PATENT DOCUMENTS

JP 2005-044386 A 2/2005

* cited by examiner

*Primary Examiner* — Sam Rizk

(74) *Attorney, Agent, or Firm* — Arent Fox LLP

(57) ABSTRACT

The data memory cell array and parity memory cell array in the memory cell array has a constitution that is capable of corresponding with a plurality of ECC code lengths. An input-side parity generation circuit that generates parities from write data, an output-side parity generation circuit that generates parities from read data, and a syndrome generation circuit that generates a syndrome bit that indicates an error bit from the read parity bits and generated parity bits are constituted so as to be capable of switching, according to the plurality of ECC code lengths.

21 Claims, 27 Drawing Sheets

FIG.7 SPECIFIC EXAMPLE OF PARITY CHECK MATRIX

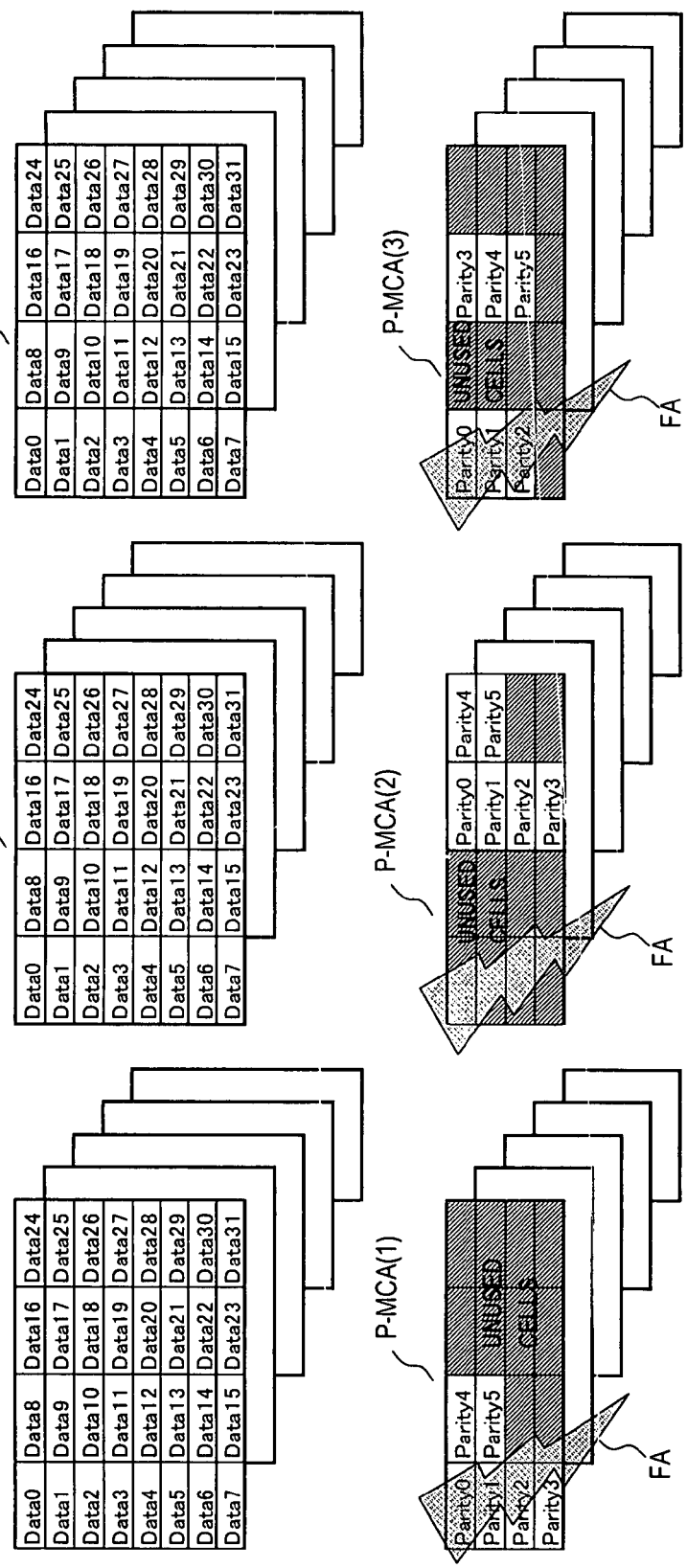

SEMICONDUCTOR MEMORY DEVICE CAPABLE OF CHANGING ECC CODE LENGTH

CROSS-REFERENCE TO RELATED APPLICATIONS

This application is based upon and claims the benefit of priority from the prior Japanese Patent Application No. 2006-214080, filed on Aug. 7, 2006, the entire contents of which are incorporated herein by reference.

BACKGROUND OF THE INVENTION

1. Field of the Invention

It is related to a semiconductor memory device capable of correcting errors in storage data and, more particularly, to a semiconductor memory device capable of changing the ECC (error correction code) code length for error correction.

2. Description of the Related Art

Semiconductor memory devices such as DPAM have come to be increasingly important in the recovery of defective bits in the progression toward larger capacities. Semiconductor memory devices with redundant constitutions in which redundant memory cell arrays are provided and defective memory cells are replaced with redundant memory cells for the recovery of defective bits, have come to be widely used.

In recent years, semiconductor memory devices capable of storage data error correction without substitution with redundant memory cells have been proposed. For example, Japanese Application Laid Open No. 2005-44386 and so forth have been proposed.

This semiconductor memory device capable of storage data error correction comprises, in addition to a memory cell array for storing data, a parity memory cell array that stores parity bits which have been generated from write data. During writing, the semiconductor memory device generates parity bits from input data and stores input data and parity data. During reading, the semiconductor memory device generates parity bits from read data, compares these parity bits with the stored parity bits, generates syndrome data that has error bit information, corrects the error bits on the basis of the syndrome data, and outputs the corrected read data.

In this ECC, with a certain Hamming code, a one-bit error in 8-bit data can be corrected by using parity bits of 4 bits with respect to 8-bit data. Further, by using parity bits of 5 bits for 16-bit data, a one-bit error among the 16 bits can be corrected. Then, generally, a one-bit error among $2^N$ bits can be corrected by using parity bits of N+1 bits for data of $2^N$ bits.

As mentioned earlier, by providing the memory cell array with a parity region in addition to a data region and providing a parity generation circuit and an error correction circuit as peripheral circuits, error correction of defective bits is possible and an increase in the yield as well as the accompanying reduction in costs can be implemented.

However, the error correction capability differs depending on the code length of the ECC and the yield also varies in accordance with error correction capability. A parity bit for N+1 bits is used for the $2^N$ bit data mentioned above. Accordingly, the redundancy of the memory cell array increases as N grows smaller and, when the defect density is low, the high redundancy increases the chip area and a cost increase is incurred. However, when the defect density is high, the defect rescue probability is high and an increase in costs can be suppressed. However, the higher N is, the lower the redundancy of the memory cell array and; when the defect density is low, an increase in costs can be suppressed. However, when the defect density is high, an increase in costs is, conversely, induced because the rescue probability is low as a result of the low error correction capability.

In other words, where the ECC code length is concerned, it is a trade-off between the possibility of an increase in the yield and an increase in the error correction probability afforded by increasing the code length, and an increase in the memory cell array area used for parity bits due to the increased code length and the accompanying enlargement of the chip. Moreover, the relationship changes depending on the defect density.

Therefore, when a semiconductor memory device is designed, the optimum ECC code length must be determined by estimating the magnitude of the defect density. However, this estimation and judgment are not necessarily straightforward.

SUMMARY OF THE INVENTION

An object is to provide a semiconductor memory device capable of optimizing the ECC code length.

A further object is to provide a semiconductor memory device capable of optimizing the ECC code length in accordance with the defect density.

In addition, a further object is to provide a semiconductor memory device capable of optionally changing a portion of the parity memory cell array in accordance with the ECC code length.

In order to achieve the above object, according to a first aspect the data memory cell array and parity memory cell array in the memory cell array has a constitution that is capable of corresponding with a plurality of ECC code lengths. An input side parity generation circuit that generates parities from write data, an output-side parity generation circuit that generates parities from read data, and a syndrome generation circuit that generates a syndrome bit that indicates an error bit from the read parity bits and generated parity bits are constituted so as to be capable of switching, according to the plurality of ECC code lengths.

According to a preferred aspect, the input-side parity generation circuit and the output-side parity generation circuit have the same constitution and are therefore commonly constructed and can be used by switching the I/O during writing and reading respectively. Further, the syndrome generation circuit can be commonly constructed with the parity generation circuits. Accordingly, these circuits can be common circuit, the input and output are switched during writing and reading, and part of the constitution is switched in accordance with the ECC code length. As a result, a semiconductor memory device capable of switching to different ECC code lengths can be provided.

In order to achieve the above objects, a second aspect is a semiconductor memory device having an error correction function, having: a data memory cell array that has a plurality of memory cells and inputs and outputs data of $2^I$ bits (where I is an integer of two or more) with respect to a data bus in response to word selection; a parity memory cell array that has a plurality of memory cells and inputs and outputs parity bits of a number of bits that corresponds to the $2^I$ bit data with respect to a parity bus in response to the word selection; a data I/O terminal; a parity generation circuit that generates the parity bits from write data of $2^I$ bits that are input from the data I/O terminal and outputs the parity bits to the parity bus; a syndrome generation circuit that generates, from the parity bits that are read from the parity memory cell array to the parity bus and read data of $2^I$ bits that are read from the data memory cell array to the data bus, a syndrome bit indicating the error bit position in the read data; and an error correction circuit that corrects errors in the read data on the basis of the syndrome bit, wherein the parity generation circuit and syndrome generation circuit are constituted so as to be capable of switching to either a first ECC having $2^I$ bit data and parity bits of I+1 bits or a second ECC having $2^J$ groups of data of $2^I$ bits (where I>J and J is an integer of one or more) and parity bits of I−J+1 bits.

In order to achieve the above objects, a third aspect is a semiconductor memory device having an error correction function, having: a data memory cell array that has a plurality of memory cells and inputs and outputs data of $2^I$ bits (where I is an integer of 2 or more) from and to a data bus in response to word selection; a parity memory cell array that has a plurality of memory cells and inputs and outputs parity bits of a number of bits that corresponds to the data of $2^I$ bits from and to a parity bus in response to the word selection; a data I/O terminal; an input-side parity generation circuit that generates the parity bits from write data of $2^I$ bits that are input from the data I/O terminal and outputs the parity bits to the parity bus; an output-side parity generation circuit that generates the parity bits from read data of $2^I$ bits that are read to the data bus from the data memory cell array; a syndrome generation circuit that generates, from the parity bits generated by the output-side parity generation circuit and the parity bits read from the parity memory cell array to the parity bus, a syndrome bit that indicates the error bit position in the read data; and an error correction circuit that corrects errors in the read data on the basis of the syndrome bit, wherein the input-side parity generation circuit, the output-side parity bit generation circuit, and the syndrome generation circuit are constituted so as to be capable of switching to either a first ECC having $2^I$ bit data and parity bits in a number of bits corresponding with this data or a second ECC having $2^J$ groups of data of $2^{(I-J)}$ bits (where I>J and J is an integer of one or more) and parity bits in a number of bits corresponding with this data.

A semiconductor memory device capable of switching to constitution of a plurality of ECC code lengths can be provided.

BRIEF DESCRIPTION OF THE DRAWINGS

FIG. 7 shows a specific example of a parity check matrix of this embodiment;

FIG. 25 shows a constitutional example of a memory cell array of this embodiment;

DESCRIPTION OF THE PREFERRED EMBODIMENTS

Preferred embodiments will be described herein below with respect to the drawings. However, the technical scope of the present invention is not limited to these embodiments and covers items appearing in the claims as well as any equivalents thereof.

Figure 1:
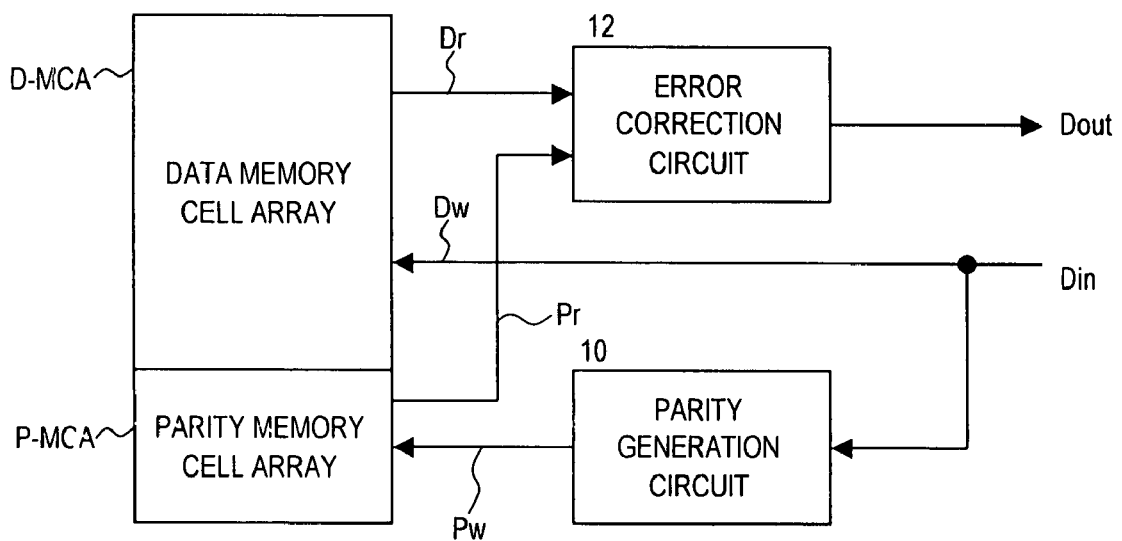
FIG. 1 is a constitutional view of a semiconductor memory device capable of error correction.

FIG. 1 is a constitutional view of a semiconductor memory device capable of error correction. The memory cell array in the semiconductor memory device comprises a memory cell array D-MCA for storing data and a memory cell array P-MCA for storing parity bits. Further, the input data Din that are written and the output data Dout that are read are input and output via a common I/O terminal.

During writing, the input data Din are written as is to the data memory cell array D-MCA and supplied to a parity generation circuit 10. The parity generation circuit 10 detects an error in the input data Din, generates parity bits of code permitting correction, and writes parity bits to the parity memory cell array P-MCA in association with the input data Din thus written. Generally, in correspondence with common word line selection, the input data Din are stored as write data Dw and the parity bits generated by the parity generation circuit 10 are stored as write parity Pw in the data memory cell array D-MCA and parity memory cell array P-MCA respectively.

Further, during reading, in response to common word line selection, read data Dr are output from the data memory cell array C-MCA and read parity bits Pr are output from the parity memory cell array F-MCA. Further, an error correction unit 12 generates new parity bits from the read data Dr, generates a syndrome bit that indicates the position of an error bit in the read data Dr by comparing the new parity bits with the read parity bit Pr, corrects the error bit in the read data Dr on the basis of the syndrome bit, and outputs the corrected data as the output data Dout.

In this embodiment, the parity generation circuit 10 and error correction unit 12 can be switched in correspondence with different ECC code lengths without changing the constitution of the memory cell array or by changing only a portion thereof). As a result, in the same semiconductor memory device, after fabrication or at the final stage of fabrication, the optimum ECC code length can be selected and the generation circuit 10 and the error correction unit 12 can be switched to a constitution which corresponds with the selected ECC code length. Therefore, the optimum ECC code length that corresponds with the defect density and so forth of the fabrication line of the product can be set and the maximum yield at the minimum cost can be implemented at this point. Further, at the test stage, an operation test can be performed after an optional ECC code length has been set and a reliability test can be executed under optional conditions.

Figure 2:
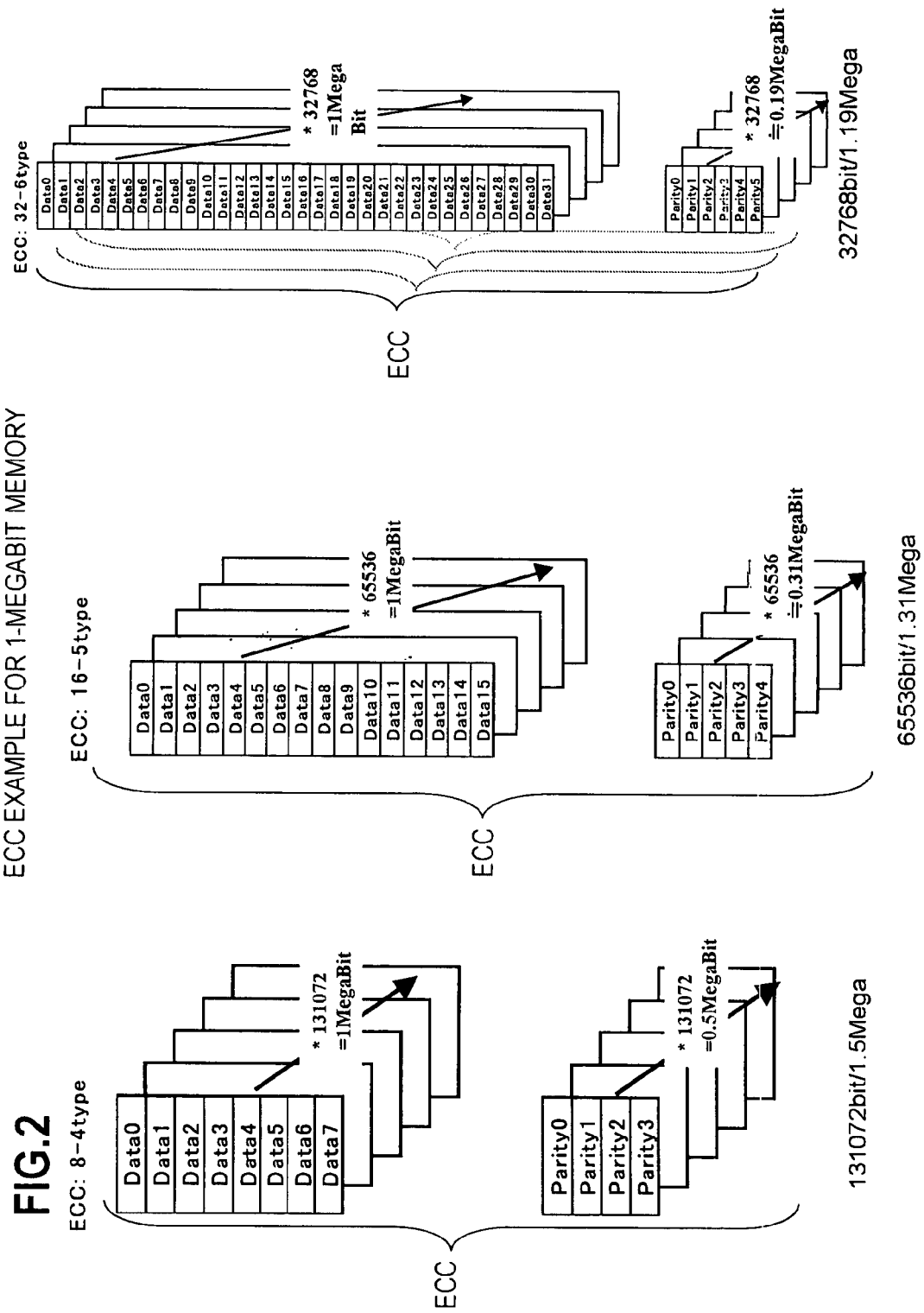
FIG. 2 shows the relationship between parity and data of three ECC code lengths.

FIG. 2 shows the relationship between the data and parities for three ECC code lengths. FIG. 2 shows constitutions of the memory cell array in a case where, based on the premise of a one-megabit capacity memory device, the ECC code length is of the 8-4 type with 8 bit data and 4 bit parities, of the 16-5 type with 16 bit data and 5 bit parities, and of the 32-6 type with 32 bit data and 6 bit parities.

With Hamming code, 4-bit parity bits are required in order to correct a one-bit defect from 8-bit data. The 8-bit data and 4-bit parity are ECC and a syndrome bit required to detect defective bits is generated from the ECC. Accordingly, the 8-4 type ECC codelength is 12 bits, there the data are 8 bits and the parity is 4 bits.

Likewise, in order to correct one-bit defects from the 16-bit data, a 5-bit parity bit is required. Therefore, the ECC code length is 21 bits, where the data are 16 bits and the parity is 5 bits. In addition, a 6-bit parity bit is required to correct a one-bit defect from the 32-bit data. The ECC code length is 38 bits, where the data are 32 bits and the parity is 6 bits.

When this is shown in a general equation, a J+1-bit parity bit is required in order to correct a one-bit defect from $2^J$-bit data. That is, the ECC is then a combination of $2^J$-bit data and a J+1-bit parity.

Further, based on the premise of a one-megabit memory device, in ECC of the 8-4 type, one word consists of 8-bit data and 131072 words occupy a total of one megabit. With respect to this one-megabit data, the parity bits are such that one word is four bits and 131072 words are required. Hence, the total is 0.5 megabits. That is, 1.5 megabits are required for the capacity of the memory cell array.

Likewise, in ECC of the 16-5 type, one word consists of 16 bit data and 65536 words occupy a total of one megabit. With respect to this one-megabit data, the parity bits are such that one word is five bits and 65536 words are required. Hence, the total is approximately 0.31 megabits. That is, 1.31 megabits are required for the capacity of the memory cell array.

Likewise, in ECC of the 32-6 type, one word consists of 32 bit data and 32768 words occupy a total of one megabit. With respect to this one-megabit data, the parity bits are such that one word is six bits and 32768 words are required. Hence, the total is approximately 0.19 megabits. That is, 1.19 megabits are required for the capacity of the memory cell array.

As mentioned earlier, as the ECC code length increases, the capacity of the redundant parity bits is reduced and the chip size can be reduced. However, when the ECC codelength increases, because a number of bits of a one-bit rescue unit (one word) becomes large, the rescue probability drops. That is, 8-type ECC, one bit can be rescued in 8-bit data. In 16-5 type ECC, one bit can be rescued in 16-bit data. In 32-6 ECC, one bit can be rescued in 32-bit data. Accordingly, of the three types, the 8-4 type ECC has the highest rescue probability and the 32-6 type ECC has the lowest rescue probability.

However, the 8-4 type has the largest number of redundant parity bits and requires the largest memory capacity and the 32-6 type has the smallest number of redundant parity bits and requires the smallest memory capacity. Hence, it is a trade-off between the rescue probability and the required memory capacity.

In the case of the semiconductor memory device capable of error correction shown in FIG. 1, the design of the memory cell array, parity generation circuit and syndrome generation circuit is carried out by selecting the optimum ECC code length among the different ECC code lengths shown in FIG. 2.

Figure 3:
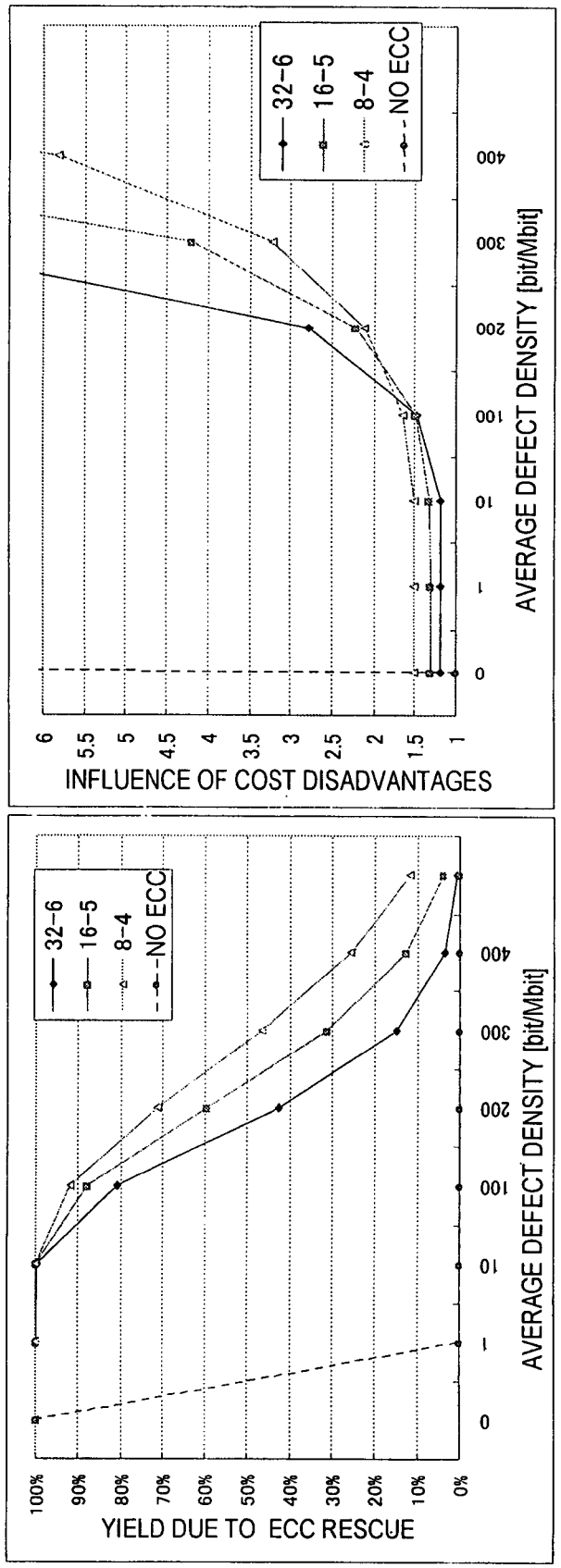
FIGS. 3A and 3B are graphs that show the relationship between the average defect density, the yield, and the cost disadvantages that correspond to the ECC code lengths.

FIGS. 3A and 3B are graphs that show the relationship between the average defect density that corresponds to the ECC codelength, the yield, and cost disadvantages. In Graph of FIG. 3A, the horizontal axis is the average defect density which indicates the number of defects per Mbit and the vertical axis is the yield due to the ECC rescue. Further, the aforementioned values are found by means of a probability calculation that uses the defective bits of a Pearson distribution based on the premise that a single defective bit is randomly produced. If the defect density of the horizontal axis is 0, 1, 10, because the defect bits can be corrected by means of ECC, there is a substantial yield of 100% with any ECC type. However, when the defect density increases, the 8-4 type has the highest rescue probability and the yield is therefore also high. The 32-6 type has the lowest rescue probability and the yield is therefore also low.

In Graph of FIG. 3B, the horizontal axis is the average defect density and the vertical axis is an index representing the influence of the cost disadvantages. Here, the influence of the cost disadvantages was determined based on the yield of graph of FIG. 3A and the assumed fabrication efficiency when the number of chips made per wafer is determined by the inverse of the capacity of the memory cell array. The lower the numerical value on the vertical axis, the lower the costs and the higher the numerical value, the higher the costs. Graph of FIG. 3B indicates the inverse of the costs for each ECC type when the defect density is equal to or less than 10 and equal to or more than 100. That is, when the defect density is equal to or less than 10, the yield as indicated in graph of FIG. 3A is substantially 100%. Therefore, the cost of the chips depends on the number of chips made per wafer. As a result, because the memory capacity is smallest for the 32-6 type, this type has the smallest costs and, because the memory capacity is largest for the 8-4 type, same has the largest costs. However, when the defect density is equal to or more than 100, the yield of the 32-6 type is much lower than that of the 8-4 type. The ratio of the corresponding cost disadvantages is large. As a result, at higher defect densities, the 8-4 type has the lowest costs and the 32-6 type has the highest costs.

As is clear from the graphs in FIGS. 3A and 3B, whereas employing the 8-4 type ECC contributes to the lowest costs under a high defect density fabrication performance, employing the 32-6 type ECC contributes to the lowest costs under a low defect density fabrication performance. That is, when the defect density is high, the ECC code length is desirably short and, when the defect density is low, the ECC code length is desirably long.

However, it is difficult to estimate the defect density of a fabrication line and the defect density of the fabrication line often fluctuates minutely. Further, the defect density also differs depending on the fabrication line. Hence, it is not easy to select the optimum ECC.

SPECIFIC EXAMPLE

Figure 4:
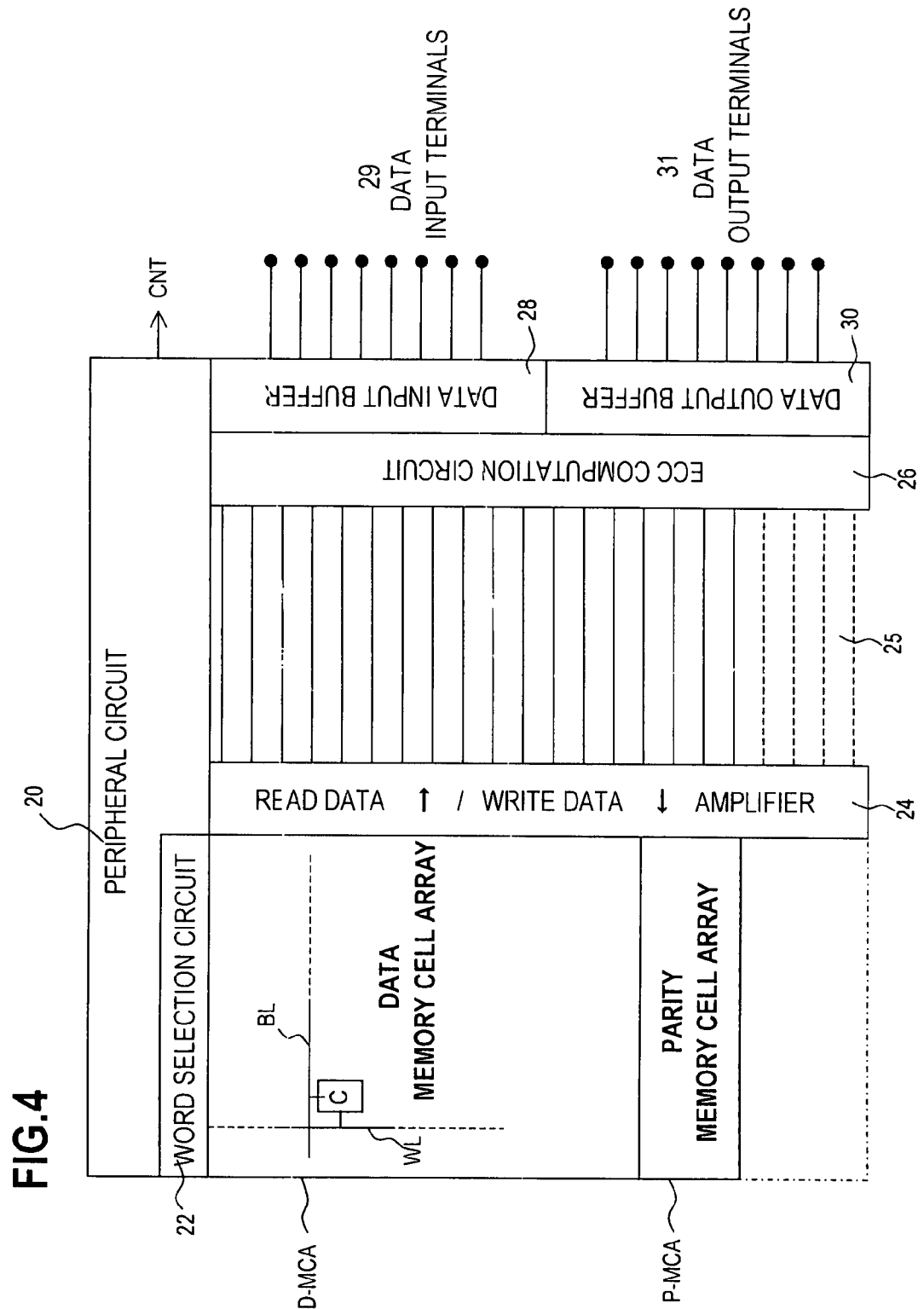
FIG. 4 is a constitutional view of the semiconductor memory device according to this embodiment.

FIG. 4 is a constitutional view of the semiconductor memory device of this embodiment. This semiconductor memory device comprises a data memory cell array D-MCA for storing data and a parity memory cell array P-MCA for storing parity bits. The memory cell arrays comprise cells C at the intersections between the word lines WL and bit lines BL. When one word line WL is selected by a common word line selection circuit 22, writing or reading is performed at the same time at the data memory cell array D-MCA and the parity memory cell array P-MCA. Accordingly, writing and reading amplifiers 24 are provided in these memory cell arrays.

The amplifier 24 is connected to an ECC computation circuit 26 via a bus 25 for the data and parity bits. Further, a data input buffer 28 is connected to data input terminals 29 and a data output buffer 30 is connected to data output terminals 31. The data input terminals 29 and output terminals 31 may be constituted by the same I/O terminals. In the example in FIG. 4, the data input terminals 29 and output terminals 31 are 8-bit terminals but are not limited to that number of terminals.

In the case of the memory cell arrays D-MCA and P-MCA, data of predetermined bits and parity bits that correspond with those data are written or read in response to the selection of one word line. Even when the ECC code length (or type) is different, the constitution of the memory cell array is fixed. However, in the parity memory cell array P-MCA, as described subsequently, because an unnecessary region exists depending on the ECC code length, a reduction in the chip size is also possible by removing the unnecessary region if required. If the unnecessary parity region is ignored, the data memory cell array D-MCA and parity memory cell array P-MCA have a fixed constitution and the amplifier 24 also has a fixed constitution.

Correspondingly, the bus 25 is also constituted by a data bus and a parity bit bus of the same number of bits irrespective of the ECC code length. However, the configuration with respect to which bits of the bus 25 are connected to the ECC computation circuit 26 is switched in dependence on the ECC code length.

Further, the ECC computation circuit 26 comprises the parity generation circuit in FIG. 1 and a syndrome generation circuit and error correction circuit. This circuit constitution has a constitution that can be switched depending on the ECC code length. Hence, the constitution of the ECC computation circuit 26 is switched in response to a switching control signal CNT. However, this switching can be switching of an I/O combination and can therefore be implemented by a group of switches. Switching of the circuit elements that constitute the computation circuit is not necessary.

The peripheral circuit 20 interprets input commands and generates control signals for read and write operations, generates a switching control signal in accordance with the selected ECC code length, and generates a test switching control signal in accordance with the ECC code length selected in test mode. The switch group of the ECC computation circuit is switch controlled in accordance with the control signal CNT.

The data input buffer 28 supplies data input from the data input terminals 29 to the ECC computation circuit 26 and the data output buffer 30 outputs the corrected data output by the ECC computation circuit 26 via the data output terminals 31. These buffers may comprise a serial/parallel conversion circuit and a parallel/serial conversion circuit for adjusting the number of bits of the data bus 25 and the number of bits of the I/O terminals 30 and 31. Alternatively, the number of bits of the I/O terminals 30 and 31 may be equal to the number of bits of the data bus 25.

Figure 5:
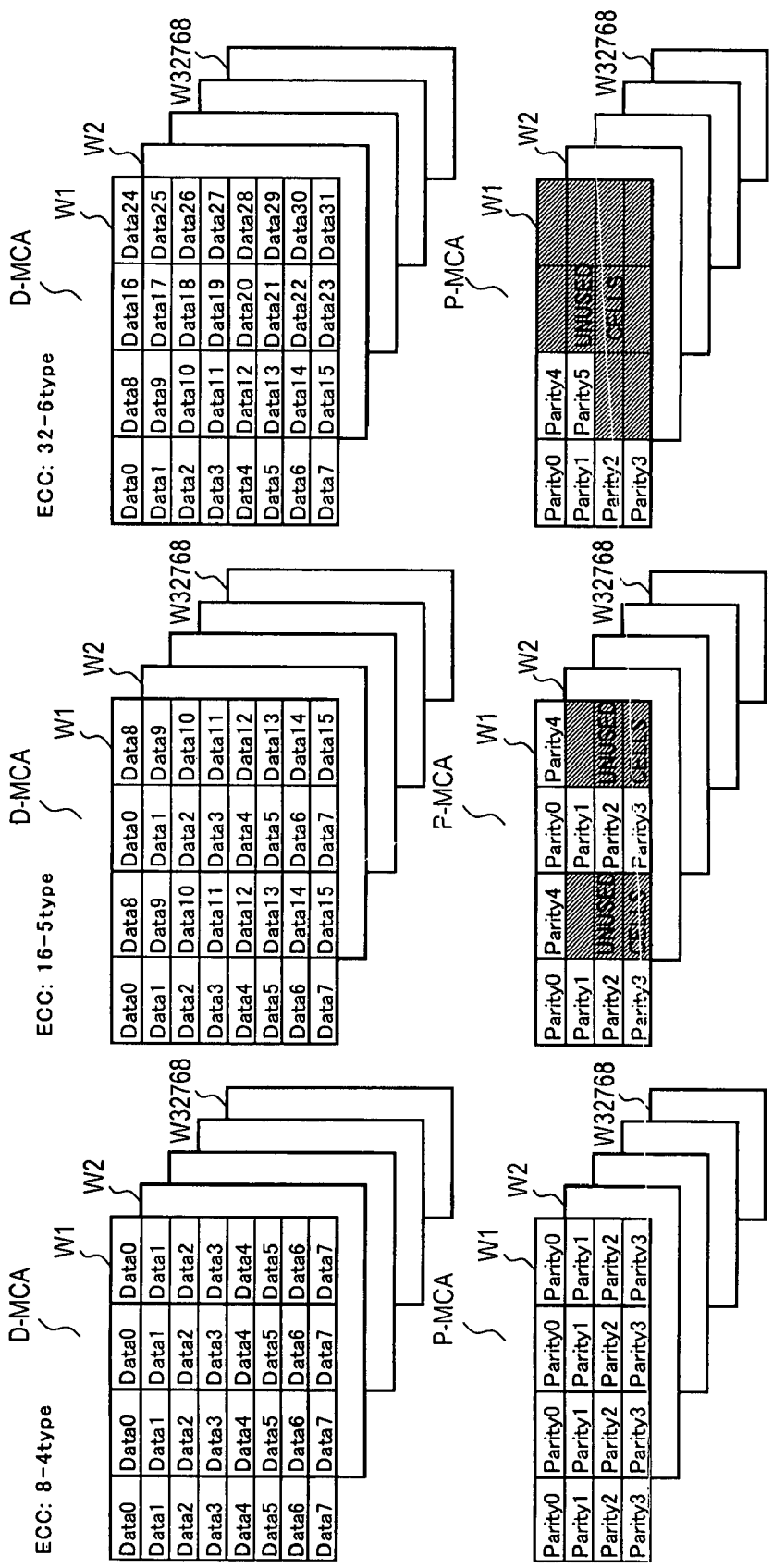
FIG. 5 shows the constitution of a memory cell array that is adapted to the ECC code length of this embodiment.

FIG. 5 shows the constitution of the memory cell arrays that correspond with the ECC code length of this embodiment. There are three types of ECC code length, namely the 8-4 type, the 16-5 type, and the 32-6 type, as mentioned earlier. In the following embodiment, a constitution capable of suitably switching to these three types of ECC code length is shown as an example. However, it is also possible to apply this constitution to other types of ECC code length.

The memory cell array comprises a data memory cell array D-MCA and a parity memory cell array P-MCA. Now, supposing that the data capacity is 1 Mbit, the data memory cell array D-MCA is constituted by 32768 words×32 bits. In other words, 32 bits is the number of bits that are input/output to/from the data memory cell array D-MCA in response to the selection of a word line and is the number of bits stored in one plane W1 in FIG. 5. Further, the planes (or words) W1 to W32768 of these 32 bits are logically divided into 32768 planes (or words). Hence, by decoding the logical addresses, one word (32 bits) among 32768 words is input/output to/from the data memory cell array D-MCA. That is, thirty-two data buses 25 are provided. Further, when 32-bit data are input/output at the same time, the data I/O terminal is a 32-bit terminal and, when 32-bit data are divided N times in order to be input/output with time division, the data I/O terminal is a 32/N bit terminal. In order to make a time-division input/output, the I/O buffer is provided with a serial/parallel conversion circuit and a parallel/serial conversion circuit.

As mentioned earlier, a word line is selected by decoding a row address and 32-bit data and 16-, 10- or 6-bit parity bits are input/output to/from the bus at the same time. Alternatively, a word line may be selected by decoding a row address such that 32-bit data of an $2^N$ group and 16-, 10- or 6-bit parity bits are output to a sense amplifier and $1/2^N$ is selected by column address such that, ultimately, 32-bit data and 16-, 10- or 6-bit parity bits are input/output to/from the bus at the same time.

In the 8-4 type case, the data are an 8 ($=2^3$) bit units. Hence, in correspondence with word line selection, 8-bit data of four groups are input/output at the same time to/from the data memory cell array D-MCA. In the case of the 16-5 type, because the data are 16 ($2^4$) bit units, 16-bit data of two groups are input/output at the same time to/from the data memory cell array D-MCA in correspondence with word line selection. In the case of the 32-6 type, data are 32 ($2^5$) bit units and, therefore, 32 bit data of one group are input/output at the same time.

However, the parity memory cell array P-MCA is constituted by 32768 words×16 bits. In other words, the maximum number of bits that are input/output to/from the parity memory cell array P-MCA in response to word line selection is 16 bits. Further, 16-bit planes (or words) W1 to W32768 are logically separated into 32768 planes (or words). Sixteen parity buses 25 are therefore provided.

In the case of 8-4 type ECC, 4-bit parity bits are generated for 8 bit data. Accordingly, in correspondence with word line selection, as indicated by the bold line frames in FIG. 5, 4-bit parity bits of four groups that correspond with 8-bit data of four groups are input/output to/from the parity memory cell array P-MCA. In the case of 16-5 type ECC, five-bit parity bits are generated with respect to sixteen bit data. Accordingly, in correspondence with word line selection, 5-bit parity bits of two groups that correspond with 16-bit data of two groups are input/output to/from the parity memory cell array P-MCA. Therefore, 6-bit unused cells (shaded parts) exist in each of the planes in the parity memory cell array P-MCA. In the case of 32-6 type ECC, 6-bit parity bits are generated for 32-bit data. Accordingly, in correspondence with word line selection, 6-bit parity bits of one group that correspond with 32 bit data of one group are input/output to/from the parity memory cell array P-MCA. As a result, 10-bit unused cells (shaded part) exist in each of the planes in the parity memory cell array P-MCA.

As discussed earlier, in order to establish correspondence with different ECC code lengths, in the data memory cell array D-MCA, $2^I$ bits are constituted as one word in correspondence with the optimum code length and can be adapted to data units of $2^{I-J}$ (I>J, J=1, 2, 3 . . . ) bits. On the other hand, in the case of the parity memory cell array P-MCA, the constitution is such that bits of I−J+1 bits×$2^J$ groups (J is the largest value that can be selected) are made one word in correspondence with the shortest code length.

Further, when the ECC code length is the shortest length, all the memory cells of the parity memory cell array P-MCA are used and, as the ECC code length grows longer, a portion of the memory cells are no longer used. In other words, the number of unused memory cells increases.

With such a constitution, the constitution of a memory cell array comprising the word line selection circuit 22, the amplifier 24, and the bus 25 can be a fixed constitution irrespective of the ECC code length. Therefore, the above constitution can be applied to a memory device capable of switching the ECC code length.

Figure 6:
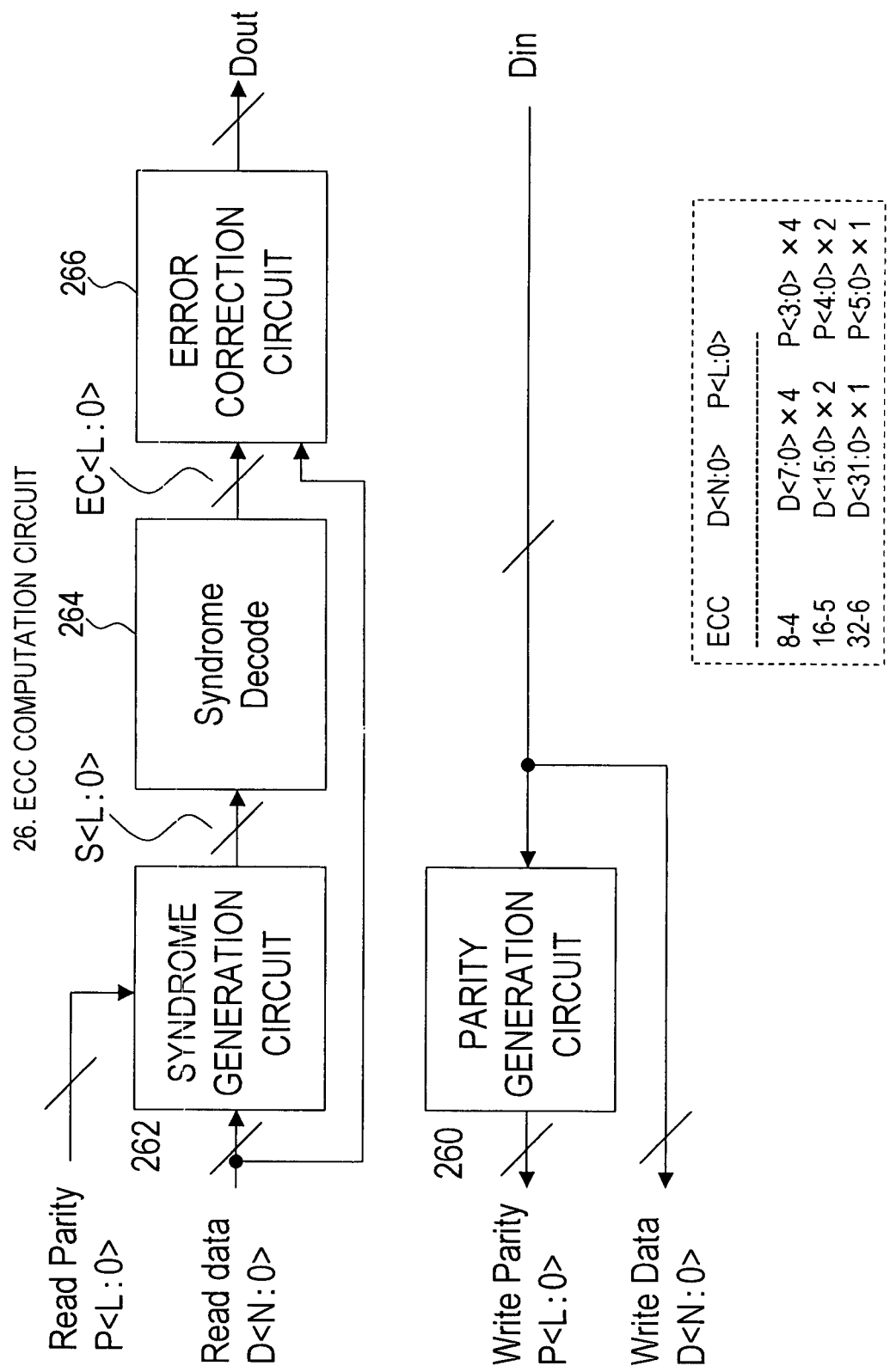
FIG. 6 is a schematic constitutional view of the ECC processor circuit of this embodiment.

FIG. 6 is a schematic constitutional view of the ECC computation circuit of this embodiment. During writing, the input data Din are stored in the data memory cell array D-MCA as the write data D<N:0> and are input to an input-side parity generation circuit 260. The input-side parity generation circuit 260 generates a parity bit P<L:0> of a number of bits that corresponds with the write data and stores same in the parity memory cell array P-MCA.

However, during reading, reading data D<N:0> and reading parity bit P<L:0> are input to a syndrome generation circuit 262. The syndrome generation circuit 262 specifically comprises an output-side parity generation circuit that generates, from the read data, a corresponding parity bit, and a syndrome generation circuit that generates a syndrome bit from the parity bit that is generated by the output-side parity generation circuit and a reading parity bit. However, the generation of the parity bit is performed by generating data XOR logic by means of an XOR circuit and the generation of the syndrome bit is also performed by generating dual-parity bit XOR logic by means of the XOR circuit. Hence, the output-side parity generation circuit and the syndrome generation circuit can be constituted by a common XOR circuit.

Further, a syndrome decoder 264 decodes the syndrome bit S<L:0> generated by the syndrome generation circuit 262 to generate an error bit signal EC<L:0> that indicates in which bit an error exists. Finally, an error correction circuit 266 corrects the error bit of the read data D<N:0> on the basis of the error bit signal EC<L:0> (bit reversal) such that error-corrected read data are output as output data Dout. The syndrome generation circuit 262, which comprises the above output-side parity generation circuit and syndrome generation circuit, and the syndrome decoder 264 may be combined and called a 'syndrome generation circuit'.

In addition, the input-side parity generation circuit 260 comprises an XOR circuit and generates XOR logic for a portion of the data selected among the input data Din to generate a parity bit. In other words, the input-side parity generation circuit 260 is also constituted by an XOR circuit. Accordingly, the input-side parity generation circuit 260 and the syndrome generation circuit 262 can be constituted as a common XOR circuit group and the constitution is preferably such that the input and output terminals can be switched by means of a switch during writing and reading.

Parity bits based on general Hamming code will be explained next. This explanation will provide a straightforward understanding of the switching structure that adapts to the ECC code length of the ECC computation circuit (described subsequently).

Figure 7:
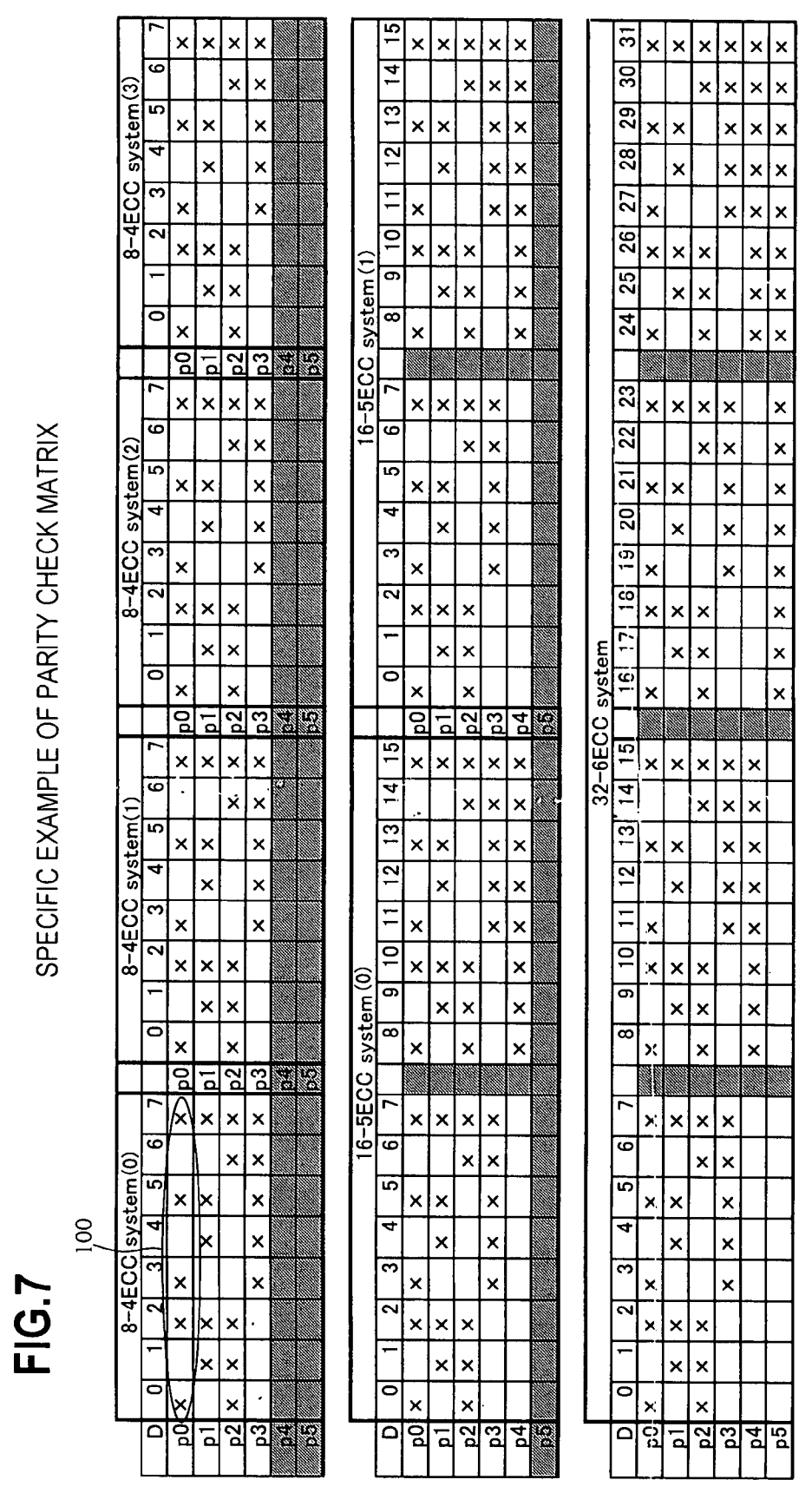

FIG. 7 shows a specific example of a parity check matrix of this embodiment. FIG. 7 shows an example of parity bits p0 to p5 for the one-word, 32-bit data D shown in FIG. 5. In the case of an 6-4 type ECC system, four groups (0) to (3) are shown, in the case of a 16-5 type ECC system, two groups (0) and (1) are shown and, in the case of 32-6 type ECC system, one group is shown.

The generation of parity bits is conducted as follows. In the case of the 8-4 type, the XOR logic of the 5 bits with a cross X among data D0 to D7 indicated by '100' in FIG. 7 results in parity bit p0 for data 100. The other parity bits p1 to p3 likewise result in XOR logic for five bits labeled with a cross X. The positions of cross X with respect to these parity bits are in nonrepetitive combinations when the respective data bits D0 to D7 are considered (vertical (direction in FIG. 7). That is, a cross X is disposed in the fields of parity bits p0 and p2 for data D0 and this combination p0 and p2 does not exist for the other data D1 to D7. Other combinations are possible as long as there is no repetition in the combinations.

In the case of the 8-4 type, the disposition of the crosses X is common to the four groups (0) to (3).

The generation of the parity bits for the 16-5 type is also similar. The XOR logic for ten bits for which a cross X is disposed among data D0 to D15 results in the respective parity bits p0 to p4. Further, the combination of the crosses X is the same as that for the 8-4 type for the parity bits p0 to p3. This contributes to a simplification of the switching structure that corresponds with the ECC code length. Further, the positions of the crosses X for the parity bit p4 are all disposed in data D8 to D15.

The generation of the parity bits in the case of the 32-6 type is similar and the XOR logic of twenty bits for which a cross X is disposed among data D0 to D31 results in the respective parity bits p0 to p5. Further, the combination of the crosses X is the same as that for the 8-4 type for the parity bits p0 to p3, which contributes to a simplification of the switching structure that corresponds with the ECC code length Further, the positions of the crosses X with respect to the parity bits p4 are disposed in the fields of data D8 to D15 and D24 to D31 and the positions of the crosses X with respect to parity bit p5 are disposed in the fields of data D16 to D31.

As mentioned earlier, by making the combinations of data (combination of crosses X) for generating the parity bits p0 to p3 of the 8-4 type which has the shortest ECC code length same as the combination of the other ECC code lengths, an XOR circuit for generating the parity bits p0 to p3 can be afforded the same constitution for all of the ECC code lengths.

Error correction will be described next. When the 8-4 type is taken by way of example, new parity bits p0 to p3 are generated by generating XOR logic according to the matrix in FIG. 7 from the read data D0 to D7. Suppose that the write data D0 to D7 are all assumed to be '0', the parity bits p0 to p3 generated during writing are '0000'. If the XOR logic is 2-bit XOR logic, the result for the exclusive of the 2-bit data is '1' when the 2-bit data are not same and '0' when the 2-bit data are the same. If the XOR logic is three bits or more XOR logic, the result is '1' when data '1' is an odd number and the result is '0' when an even number. Therefore, if all the write data are '0', all the parity bits p0 to p3 are '0'.

Further, suppose that the parity bits p0 to p3 generated from the read data D0 to D7 are '1010'. In this case, when the read parity bit '0000' and newly generated parity bit '1010' are compared, the mismatched bits are p0 and p2. In other words, when this comparison is made with the generation of XOR logic, the comparison result code obtained '1010'. When the comparison result code '1010' is compared with the combination of crosses X of the matrix in FIG. 7, it is established that code '1010' matches the combination of crosses X for data D0. Therefore, it is detected that data D0 contains an error. In other words, this means that read data D0 to D7 are '10000000' and the parity bits p0 to p3 generated from those read data are '1010'.

Further, when the newly generated parity bits are '0000', because the new and old parity bits match one another, it is established that no error exists.

Thus, among the write data D0 to D7, the parity bits p0 to p3 are generated by the XOR logic of a unique combination of a portion of the bits, parity bits p0 to p3 are newly generated once again from the read data D0 to D7, and the new and old parity bits are compared so that it is possible to detect which bit of the read data D0 to D7 has an error from the combination of mismatched bits.

As can be seen from the above explanation, the input-side parity generation circuit and the output-side parity generation circuit can both be constituted by an XOR logic circuit. Furthermore, the syndrome generation circuit for comparing the two parity bits can also be constituted by an XOR logic circuit. Further, the output-side parity generation circuit and the syndrome generation circuit can be constituted by the same XOR logic circuit. Accordingly, the input-side and output-side parity generation circuits and the syndrome generation circuit can all be constituted by a common XOR logic circuit. By switching the decision of whether to input the read parity bit depending on writing and reading and by switching the decision of which data group XOR logic output to output as a parity bit or syndrome bit in accordance with the ECC code length, the ECC computation circuit can be afforded the minimum circuit scale.

Figure 8:
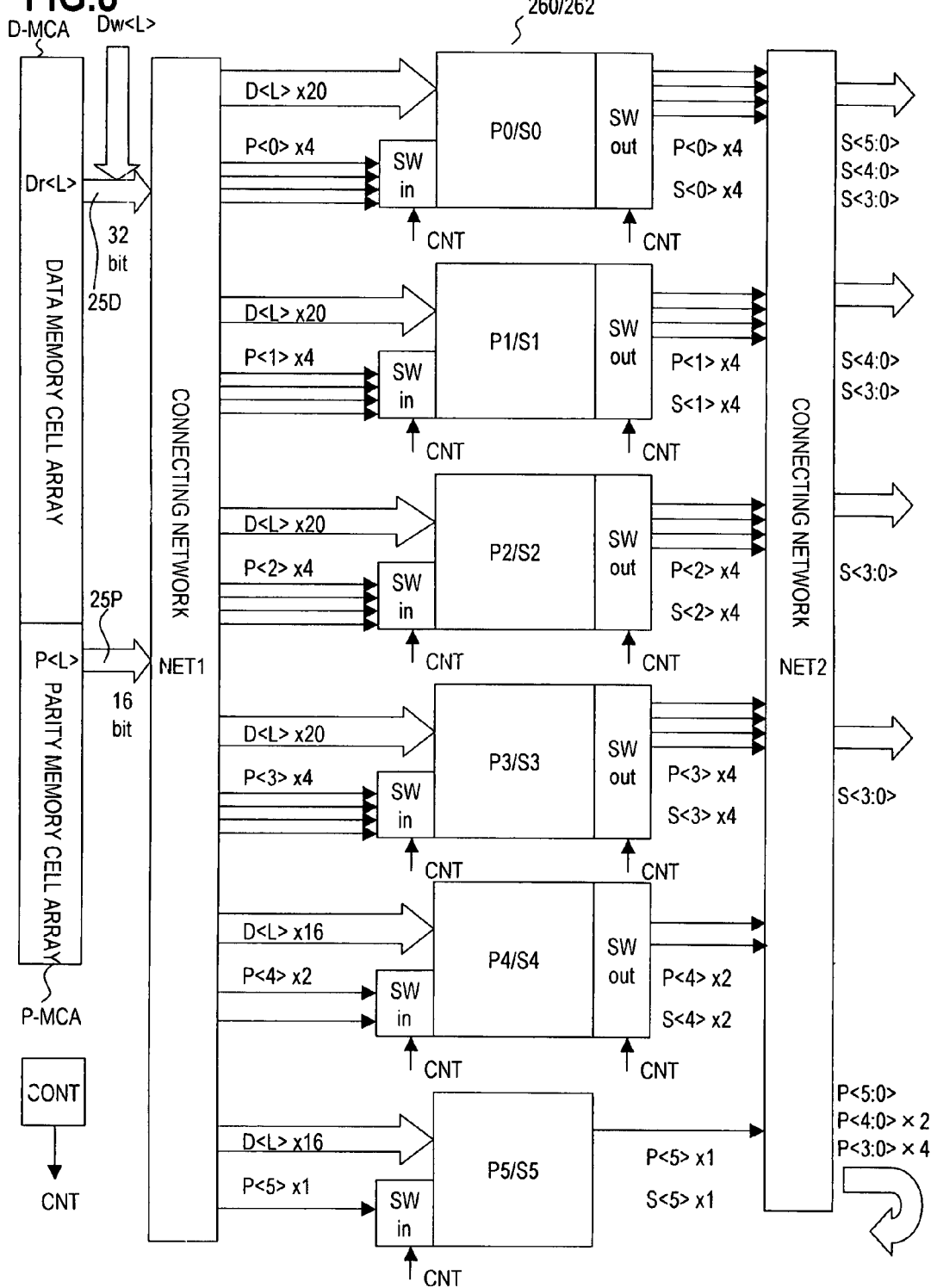
FIG. 8 is a constitutional view of an ECC logic circuit of this embodiment.
Figure 9:
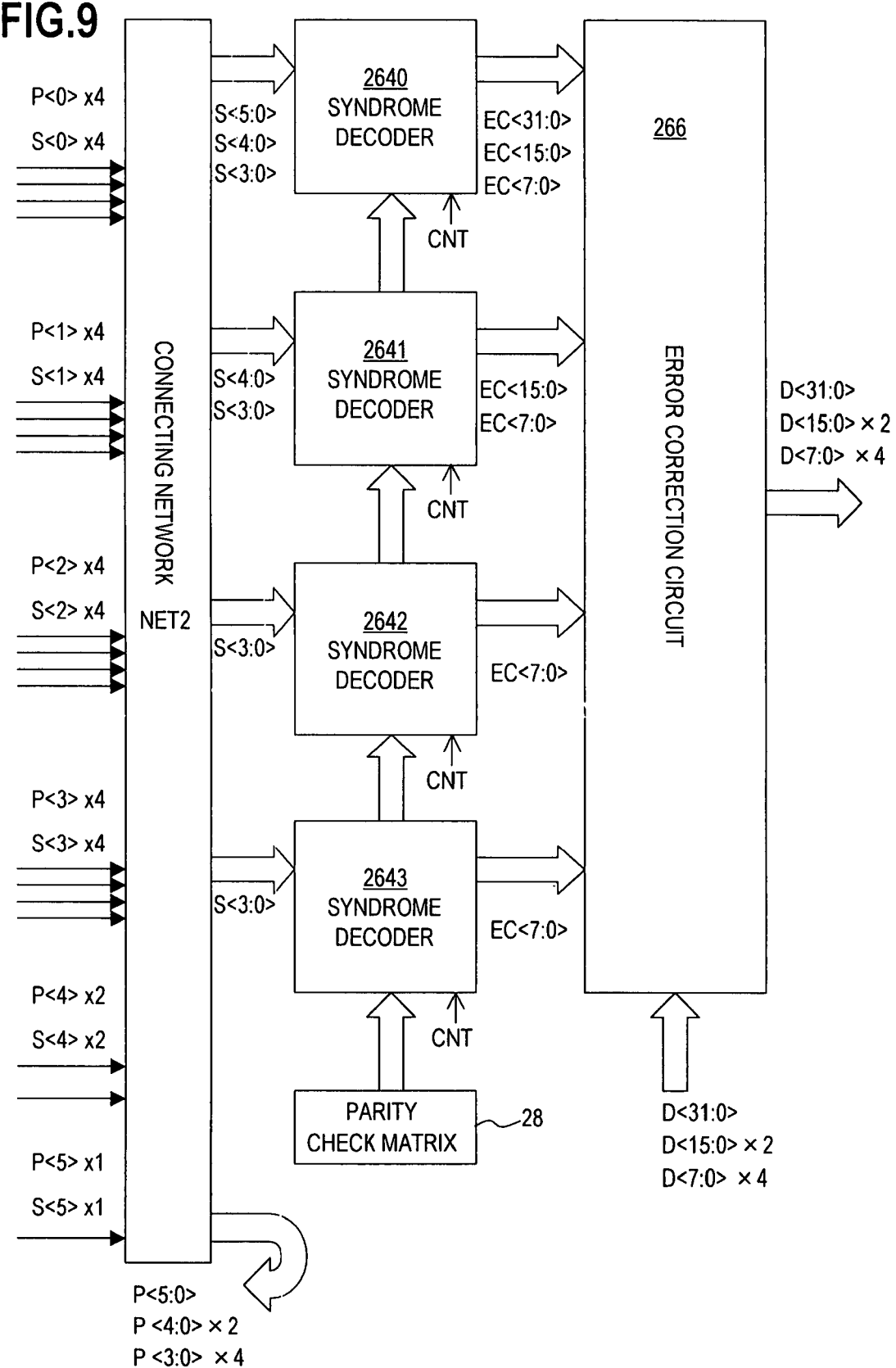
FIG. 9 is a constitutional view of the ECC logic circuit of this embodiment.

FIGS. 8 and 9 are constitutional views of the ECC logic circuit of this embodiment. In this ECC logic circuit, the input-side parity generation circuit 260, output-side parity generation circuit and syndrome generation circuit 262 are constituted by a common XOR circuit. Hereinbelow, this common XOR circuit will be known as a party/syndrome generation circuit P/S. Furthermore, FIG. 8 shows a control signal CNT for switching according to the ECC code length and a control signal generation circuit CONT that generates a control signal CNT for switching between writing and reading.

As illustrated in FIG. 7, the respective parity bits p0 to p6 are generated from combinations of crosses X of the data D0 to D7, D0 to D15, and D0 to D31. Therefore, the parity/syndrome generation circuit 260/262 is constituted by six circuits P0/S0 to P5/S5 that generate the parity bits p0 to p6. S<N> in FIG. 7 indicates the syndrome bit.

The data memory cell array D-MCA is connected to a 32-bit data bus 25D; the parity memory cell array P-MCA is connected to a 16-bit parity bus 25P, and these buses 25D and 25P are connected in a corresponding combination to the input terminals of the parity/syndrome generation circuits P0/S0 to P5/S5 via a connecting network NET1. Further, each of the parity/syndrome generation circuits P0/S0 to P5/S5 output a parity bit P<L> or a syndrome bit S<L>. Of these, the parity bit P<5:0>, two sets of P<4:0> or four sets of P<3:0> are supplied to the parity memory cell array P-MCA and the syndrome bit S<5:0>, two sets of S<4:0> or four sets of S<3:0> are supplied to the syndrome decoders 2640 to 2643 in FIG. 9 via the connecting network NET2.

FIG. 9 shows four syndrome decoders 2640 to 2643 and the error correction circuit 266. The syndrome decoders compare the respective syndrome bits S<5:0>, two sets of S<4:0>, or the four sets of S<3:0> with the positions of the crosses X of the parity check matrix of FIG. 7 stored n the ROM 28, generates an error correction code EC that indicates the matching bits, and supplies same to the error correction circuit 266. FIG. 9 will be described in detail once again.

The parity/syndrome generation circuit P0/S0 inputs 20 bits among the 32-bit write data Dw or read data Dr, generates the XOR logic thereof, and generates the parity bits P<0>. The 20-bit combinations are as indicated by the crosses X in FIG. 7 and are common independent on the ECC data length. Furthermore, with regard to the generated parity bits P<0>, four parity bits P<0> are generated from the 8-4 type, two parity bits P<0> are generated from the 16-5 type, and one parity bit P<0> is generated from the 32-6 type. This switching is performed by the output-side switch group SWout in accordance with the switching control signal CNT.

During reading, the parity/syndrome generation circuit P0/S0 generates and further XOR logic for 20 bits among the read data Dr, to generate new parity bit XOR logic for the read/new parity bit P<0> to generate a syndrome bit S<0>. Where the input parity bits P<0> are concerned, four parity bits P<0> are generated for the 8-4 type, two parity bits P<0> are generated for the 16-5 type, and one parity bit P<0> is generated for the 32-6 type and, so too with the output syndrome bits S<0>, four, two and one bits are likewise output for each type. This switching is performed by the input-side switch group SW in and the output-side switch group SWout in accordance with the switching control signal CNT.

The parity/syndrome generation circuits P1/S1 to P3/S3 have the same constitution as that of the parity/syndrome generation circuit P0/S0.

Figure 14:
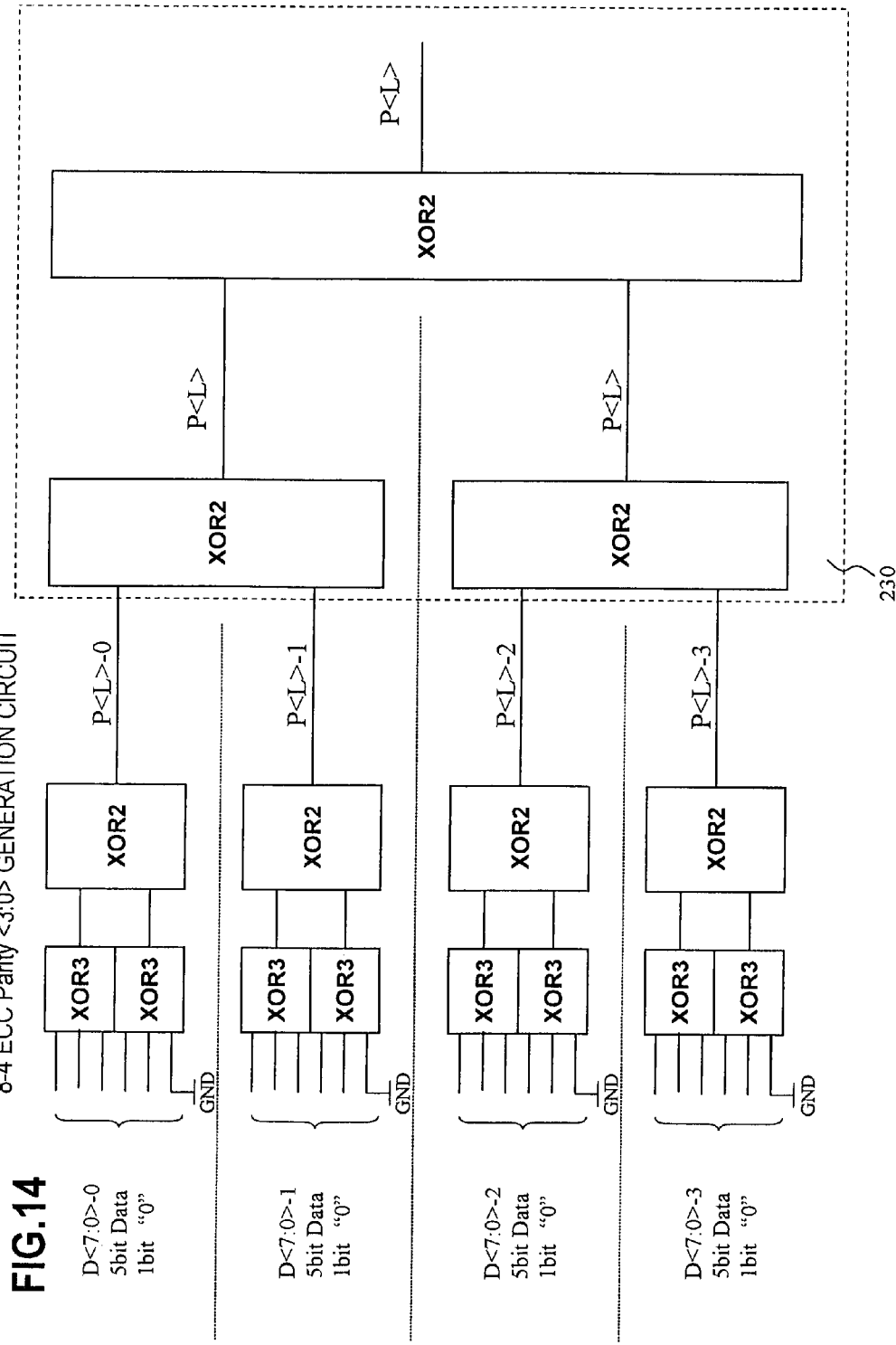
FIG. 14 is a parity generation circuit in the case of an 8-4 type.
Figure 15:
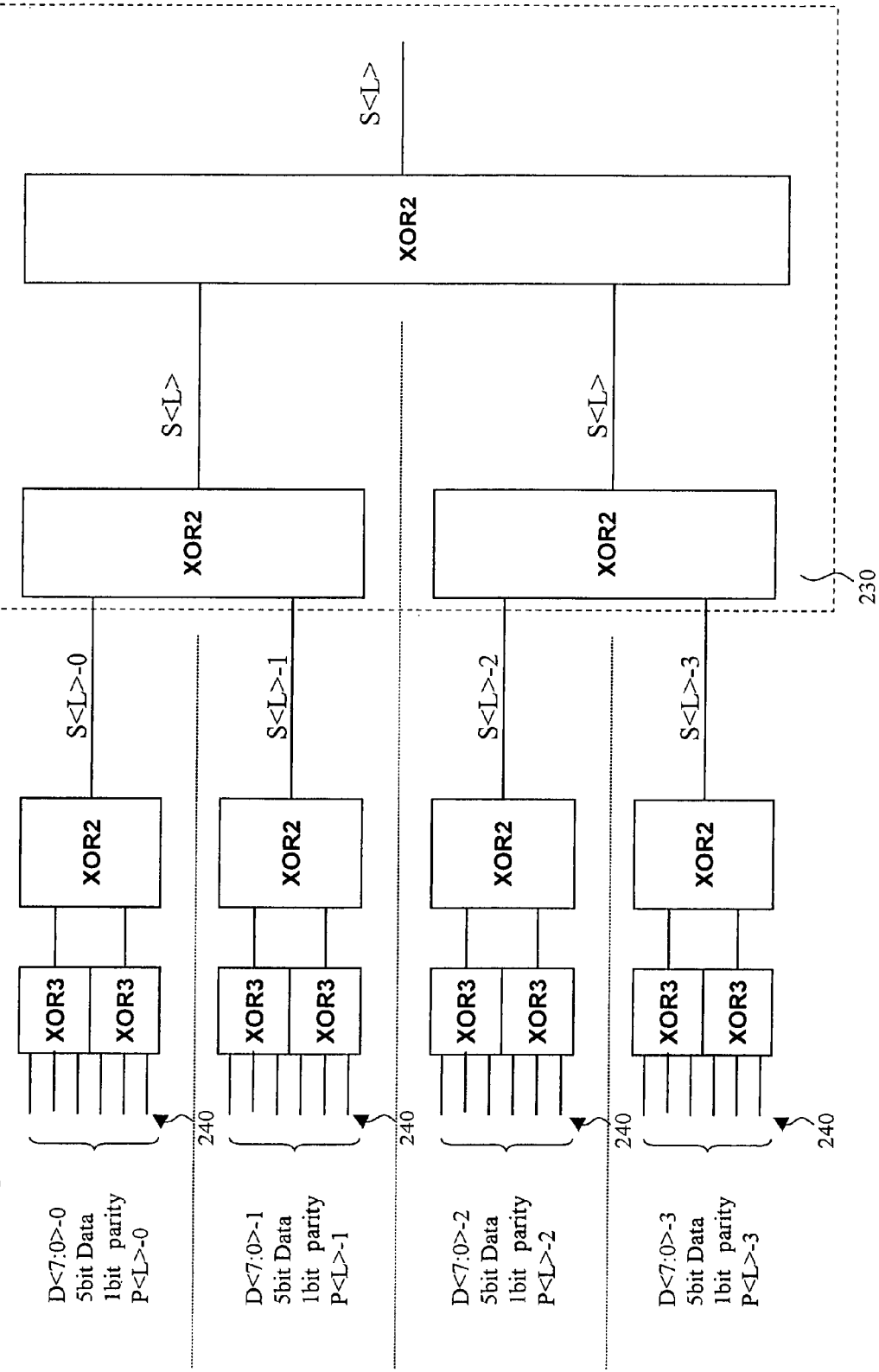
FIG. 15 is a syndrome generation circuit in the case of the 8-4 type.
Figure 16:
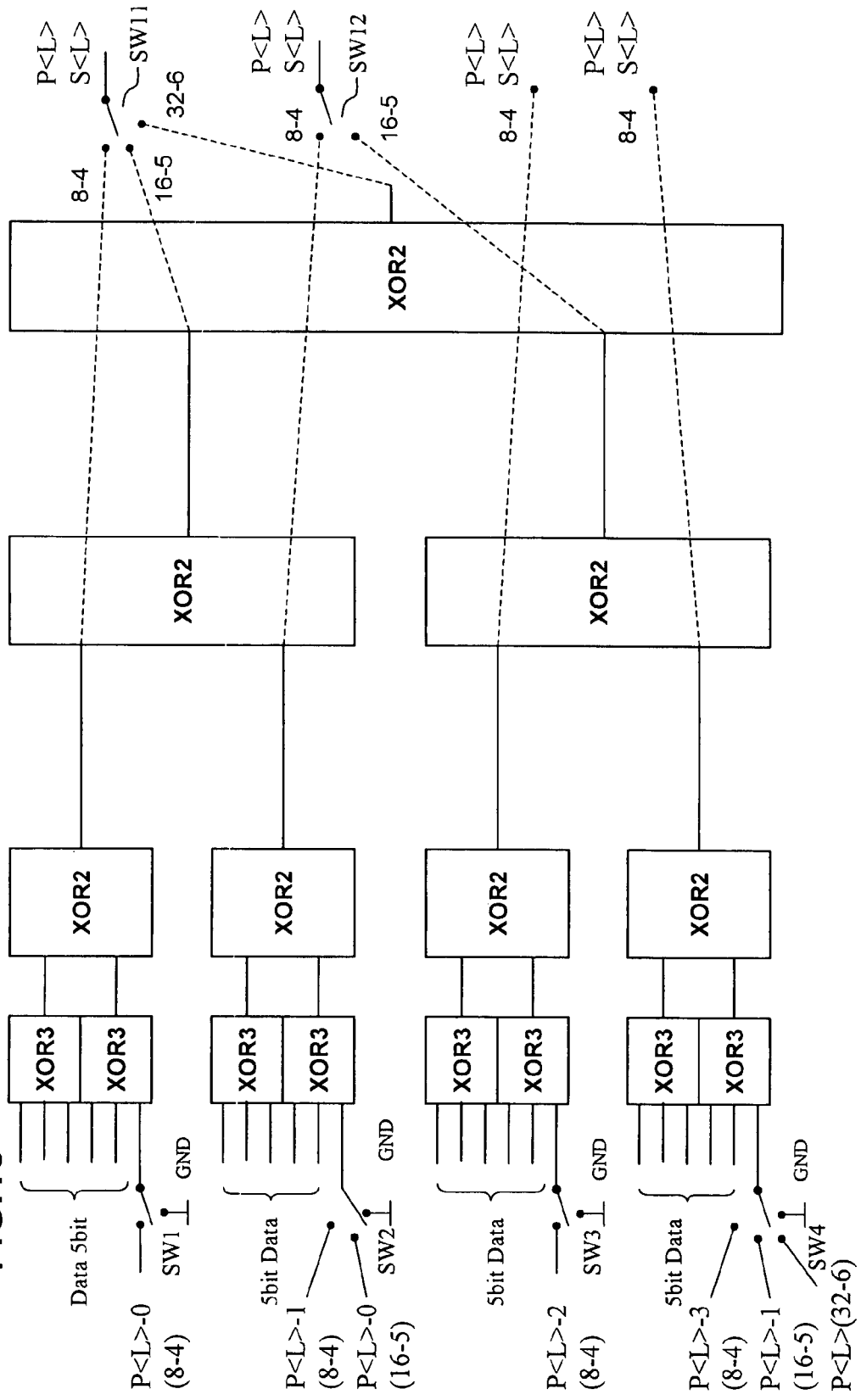
FIG. 16 shows parity/syndrome generation circuits P0/S0 to P3/S3 which are capable of switching to three ECC code lengths.

FIGS. 10 to 16 are circuit diagrams according to the three ECC types of the parity/syndrome generation circuit P0/S0 to P3/S3. The constitution of the parity generation circuit and the constitution of the syndrome generation circuit are shown as each of the three types. FIG. 16 contains a switch group that allows these six circuit configurations shown in FIGS. 10 to 15 to be switched.

Figure 10:
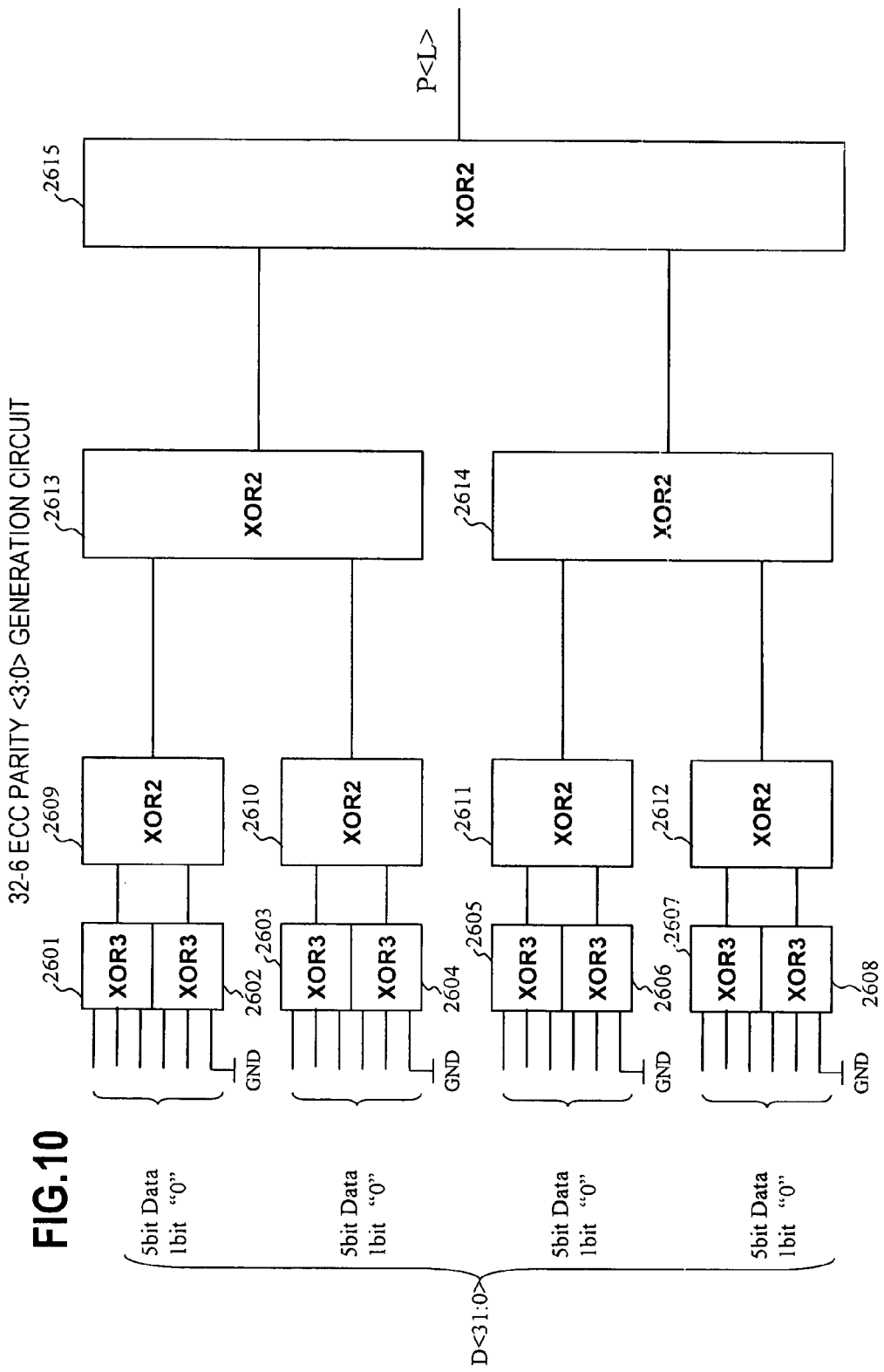
FIG. 10 is a parity generation circuit in the case of a 32-6 type.

FIG. 10 is a parity generation circuit in the 32-6 type case. This circuit has eight three-input XOR circuits 2601 to 2608 provided on the input side and connected to a 24-bit input terminal. The outputs of the 3-input XOR circuit are input to four dual-input XOR circuits 2609 to 2612, the outputs of which are input to two dual-input XOR circuits 2613 and 2614, the outputs of which are input to a final-stage dual-input XOR circuit 2615, the output of which is the parity bit P<L>. The parity bit is any of P<0> to P<3>.

As mentioned earlier, by providing a constitution in which XOR circuits are hierarchized, it is also possible to switch to different ECC code lengths as described subsequently.

The 24-bit input terminal is divided into four groups to each of which are input 5-bit data with the remaining single bit connected to the ground terminal GND at logic '0'. The logic '0' has no influence at all on the XOR logic. The 5-bit data of the four groups is, as shown in FIG. 7, a combination of 20-bit data in which crosses X are disposed from 32-bit data D0 to D31. Hence, by inputting 20-bit data of the combinations shown in FIG. 7 to each of the parity/syndrome circuits P0/S0 to P3/S3, the parity bits P<0> to P<3> are generated.

Figure 11:
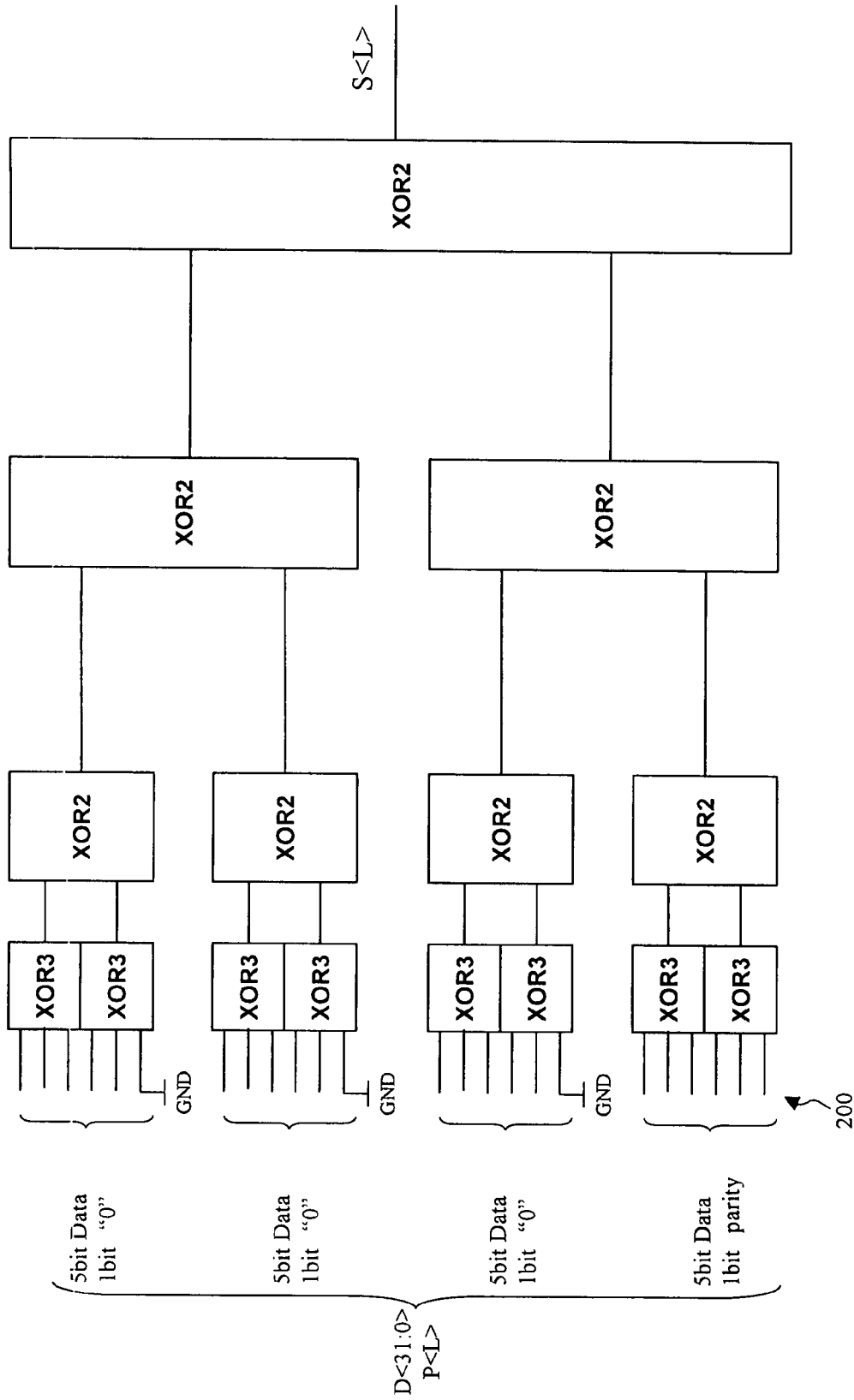
FIG. 11 is a syndrome generation circuit in the case of a 32-6 type.

FIG. 11 is a syndrome generation circuit in the 32-6 type case. This circuit is constituted by 24-bit input terminal, eight three-input XOR circuits, seven dual-input XOR circuits, and a one-bit output terminal as per FIG. 10. Further, the 5-bit data are input in three groups to the input terminals which are divided into four groups and the remaining one bit is connected to the ground terminal. In another group, as indicated by arrow 200 in FIG. 11, 5-bit read data and one-bit read parity bit are input. In other words, the XOR logic for the 20-bit read data and one-bit parity bit is output as a syndrome bit S<L>. In other words, the circuit in FIG. 11 differs only from FIG. 10 with respect to whether the logic '0' of the ground GND is input or the read parity bit P<L> is input to the input terminal of arrow 200. Accordingly, this switching may be performed by means of control signals that distinguish between writing and reading.

Figure 12:
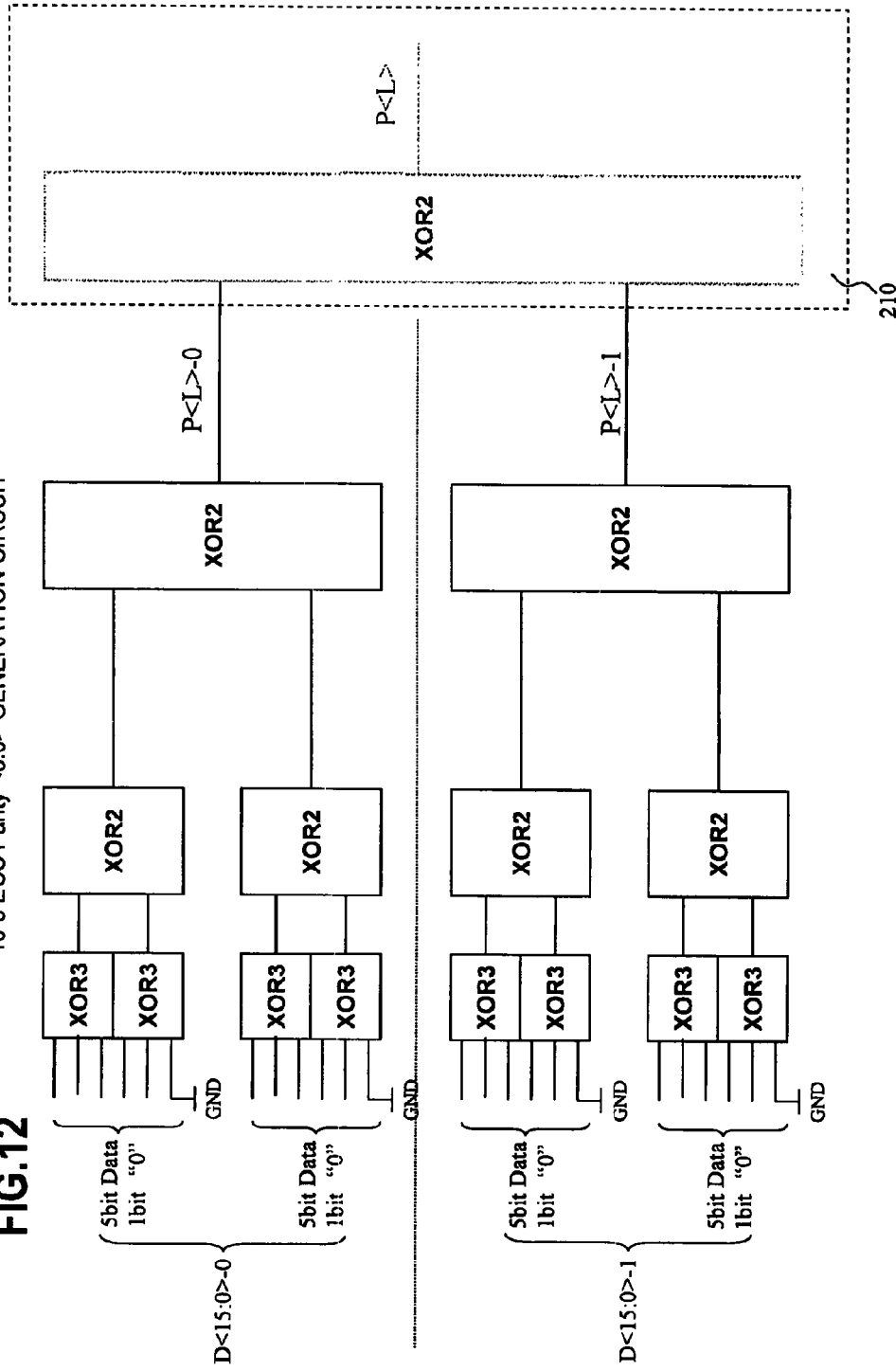
FIG. 12 is a parity generation circuit in the case of a 16-5 type.

FIG. 12 is a parity generation circuit in the case of the 16-5 type. This circuit is constituted by a 24-bit input terminal, eight three-input XOR circuits XOR3, six dual-input XOR circuits XOR2, and a 2-bit output terminal P<L>. In other words, the part 210 of the final-stage dual-input XOR circuit is not used. Further, as shown in FIG. 7, in the case of the 16-5 type, because parity bits P<L> are generated for each of the data of two groups, XOR logic for the respective groups is generated by means of upper and lower XOR circuit groups that are separated by the horizontal broken line in FIG. 12. In other words, parity bits P<L>–0 is generated from ten bits among the data D<15:0>–0 of the first group and parity bit P<L>–1 is generated from ten bits among the data D<15: 0>–1 of the second group.

Figure 13:
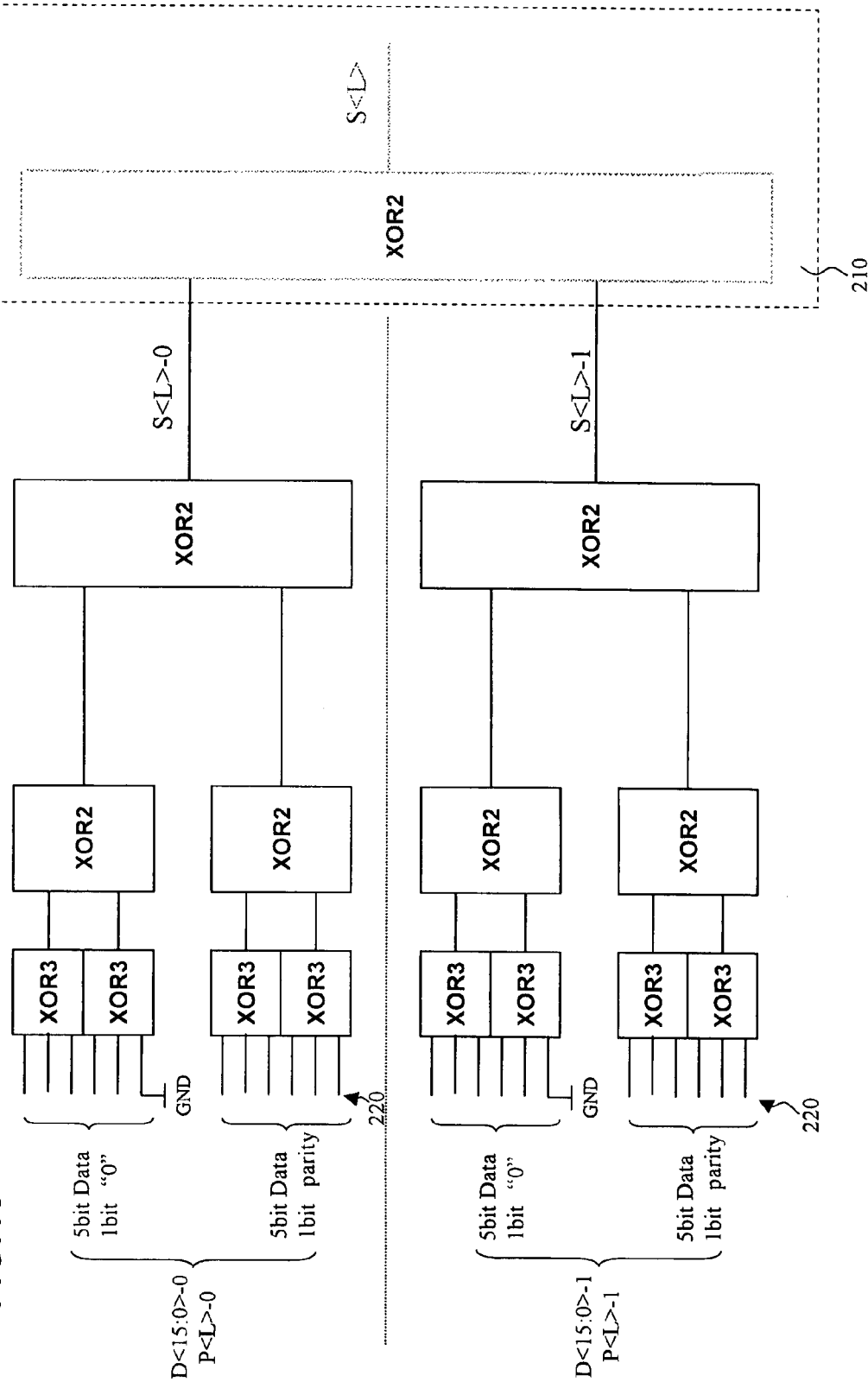
FIG. 13 is a syndrome generation circuit in the case of the 16-5 type.

FIG. 13 is a syndrome generation circuit in the case of the 16-5 type. As per FIG. 12, the syndrome generation circuit is constituted by a 24-bit input terminal, eight three-input XOR circuits XOR3, six dual-input XOR circuits XOR2, and a 2-bit output terminal S<L>. In other words, the part 210 of the final-stage dual-input XOR circuit is not used. Further, FIG. 12 differs in that read the parity bits P<L>–0 and P<L>–1 are input in the positions of the input terminals denoted by arrows 220 and also differs in that the output is a syndrome bit. The combinations of the input data D<15:0> are the same as those of FIG. 12. Accordingly, the part denoted by the arrow 220 is switched during reading and writing.

FIG. 14 is a parity generation circuit in the case of the 8-4 type. This circuit is constituted by a 24-bit input terminal, eight three-input XOR circuits XOR3, four dual-input XOR circuits XOR2, and a 4-bit output terminal P<L>. In other words, part 230 of the final-stage three dual-input XOR circuits is not used. Further, as shown in FIG. 7, in the case of the 8-4 type, parity bits P<L> are generated for each of the data of four groups. Hence, XOR logic for the respective groups is generated by four XOR circuit groups separated by the horizontal lines in FIG. 14. In other words, parity bit P<L>–0 is generated from five bits among data D<7:0>–0 of the first group and parity bit P<L>–1 is generated from five bits among data D<7:0>–1 of the second group, and, likewise for the third and fourth groups, parity bits P<L>–2 and P<L>–3 are generated.

FIG. 15 is a syndrome generation circuit of the 8-4 type case. As per FIG. 14, the syndrome generation circuit is constituted by a 24-bit input terminal, eight three-input XOR circuits, four dual-input XOR circuits, and a 4-bit output terminal S<L>. Part 230 of the three final-stage dual-input XOR circuits is not used. Further, FIG. 14 differs in that the parity bits P<L>–0, P<L>–1, P<L>–2, and P<L>–3 are input in the positions of the input terminals indicated by arrows 240 and also differs in that the outputs are syndrome bits. The combination of data D<7:0> thus input is the same as that of FIG. 14. Hence, the part indicated by the arrow 240 is switched when writing and reading.

FIG. 16 shows parity/syndrome generation circuits P0/S0 to P3/S3 which are capable of switching to three ECC code lengths. As shown in FIGS. 10 to 15, switching between the input terminals indicated by the arrows 200, 220 and 240 during reading and writing is required for each ECC type. Further, the parity bit to be input to the input terminal and the parity bit or syndrome bit to be output to the output terminal must be switched in accordance with the three ECC types.

FIG. 16 shows switches SW1, SW2, SW3, and SW4 as the input-side switch group SWin in FIG. 8 and switches SW11 and SW12 as the output-side switch group SWout. The switching of these switches is as detailed below and the circuits shown in FIGS. 10 to 15 are implemented with such switching.

SW1: during writing, SW1 is connected to GND; during reading, for the 8-4 type, SW1 is connected to the parity P<L>–0 and, for the 16-5 and 32-6 types, the SW1 is connected to GND.

SW2: during writing, SW2 is connected to GND; during reading, for the 8-4 type, SW2 is connected to the parity P<L>–1; for the 16-5 type, SW2 is connected to parity P<L>–0; and, for the 32-6 type, SW2 is connected to GND.

SW3: during writing, SW3 is connected to GND; during reading, for the 8-4 type, SW3 is connected to the parity P<L>–2 and, for the 16-5 and 32-6 types, the SW3 is connected to GND.

SW4: during writing, SW4 is connected to GND; during reading, for the 8-4 type, SW4 is connected to the parity P<L>–3; for the 1-5 type, SW4 is connected to parity P<L>–1; and, for the 32-6 type, SW4 is connected to parity P<L>.

SW11: during both writing and reading, SW11 is connected to any of terminals 8-4, 16-5, and 32-6. However, during writing, the output is a parity bit P<L> and during reading, the output is a syndrome bit S<L>.

SW12: during both writing and reading, SW12 is connected to either terminal 8-4 or 16-5 and, in the case of the 32-6 type, the output terminal is not used.

As mentioned earlier, the output terminal is a four-bit output in the case of the 8-4 type, a two-bit output in the case of the 16-5 type, and a one-bit output in the case of the 32-6 type. Conversely, three output terminals are not used in the case of the 32-6 type and two output terminals are not used in the case of the 16-5 type. The control of these switches is performed by means of a switching control signal CNT that is generated in accordance with writing and reading and the ECC code length (8-4, 16-5, 32-6). Furthermore, the input from the data bus to the input terminal does not require switching.

Returning now to FIG. 8, the parity/syndrome generation circuit P4/S4 is as shown in FIG. 7 and, during writing, sixteen bits among 32-bit data D<L> are input to generate the required parity bits P<4>. Further, during reading, the same circuit inputs 16 bits among 32-bit data D<L> and outputs a syndrome bit S<4> by inputting the required parity bits P<4> thus react.

The parity/syndrome generation circuit P4/S4 is not required for the 8-4 type and is used for the 16-5 and 32-6 types. In the case of the 16-5 type, parity bits P<4> or syndrome bits S<4> of two groups are generated in each case from 8 bits among data D<15:0> of two groups. In the case of the 32-6 type, a single parity bit P<5> or syndrome bit S<5> is generated from sixteen bits among the data D<31:0> of one group. Therefore, the switching control signal CNT for the input-side switch group SWin is generated according to whether reading or writing is being performed and whether the type is the 16-5 type or 32-6 type. Further, the switching control signal CNT for the output-side switch group SWout is generated according to whether the type is the 16-5 type or 32-6 type.

Figure 19:
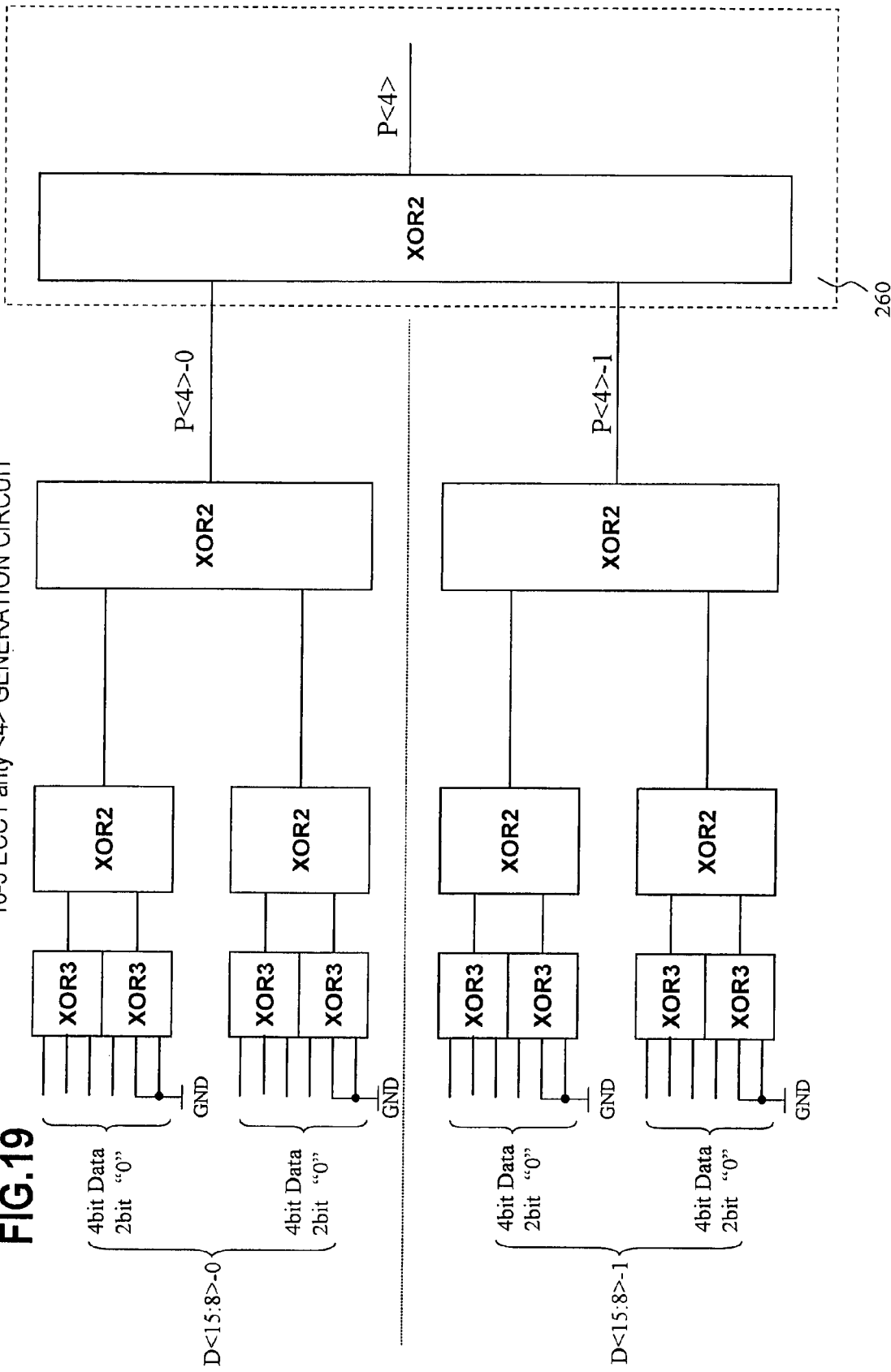
FIG. 19 is a parity generation circuit in the case of the 8-4 type.
Figure 20:
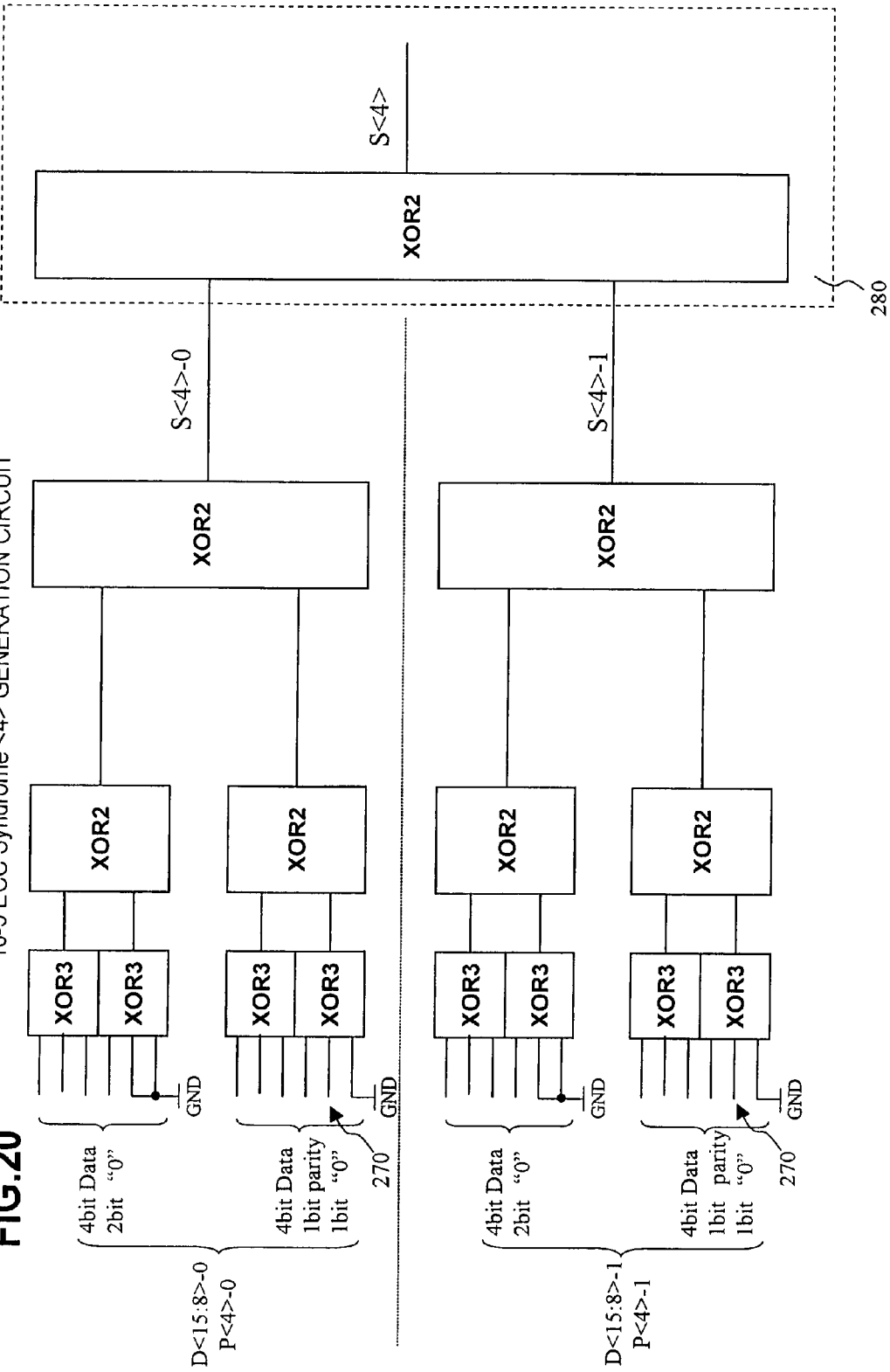
FIG. 20 is a syndrome generation circuit in the case of the 8-4 type.
Figure 21:
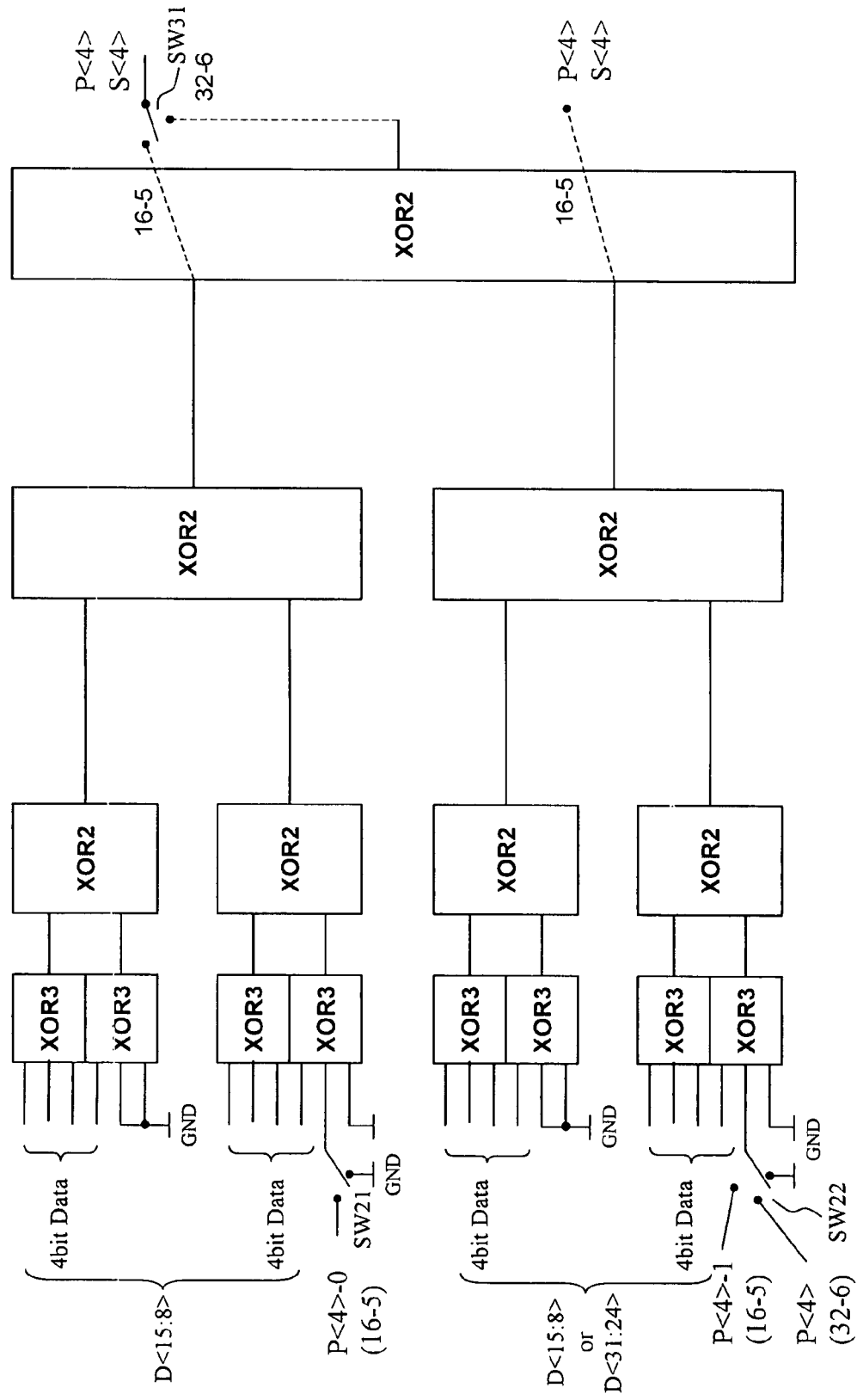
FIG. 21 shows a parity/syndrome generation circuit P4/S4 which is capable of switching to two ECC code lengths.

FIGS. 17 to 21 are circuit diagrams for each of two ECC types of parity/syndrome generation circuit P4/S4. These two types are shown with the constitution of a parity generation circuit and the constitution of a syndrome generation circuit respectively. FIG. 21 comprises a switch group that permits the switching of four circuit constitutions.

Figure 17:
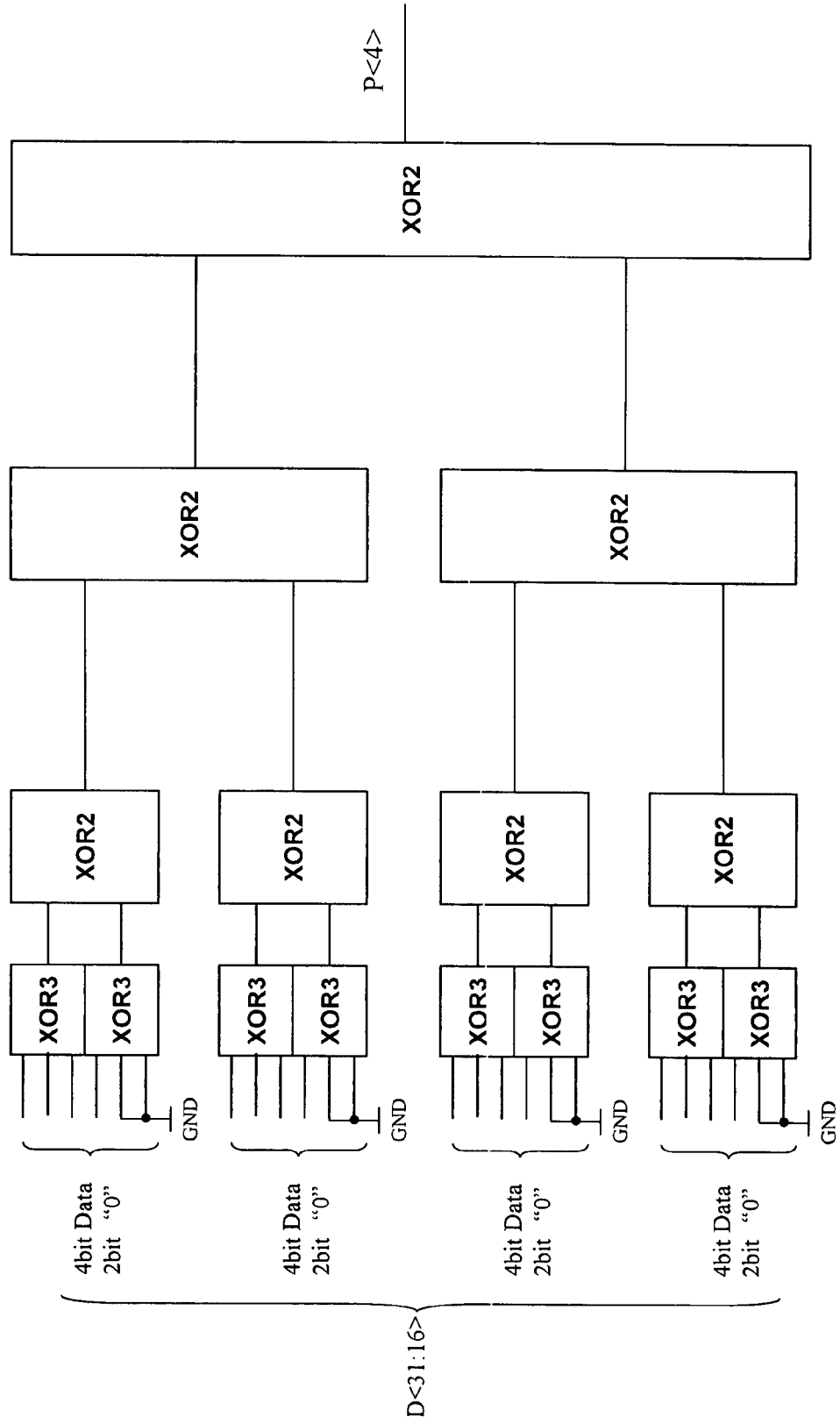
FIG. 17 is a parity generation circuit in the case of the 16-5 type.

FIG. 17 is a parity generation circuit in the case of the 32-6 type. This circuit comprises eight three-input XOR circuits XOR3 provided on the input side and connected to a 24-bit input terminal. Further, the seven dual-input XOR circuits XOR2 are constituted in three levels and the output of the final-stage dual-input XOR circuit XOR2 is parity bit P<4>. Of the 6-bit inputs of one pair of input-stage XOR3, data are input in four bits and two bits are connected to ground GND to produce logic '0'. Further, among the data D<31:0>, 16-bit data D<31:16> with the crosses X in FIG. 7 are input.

Figure 18:
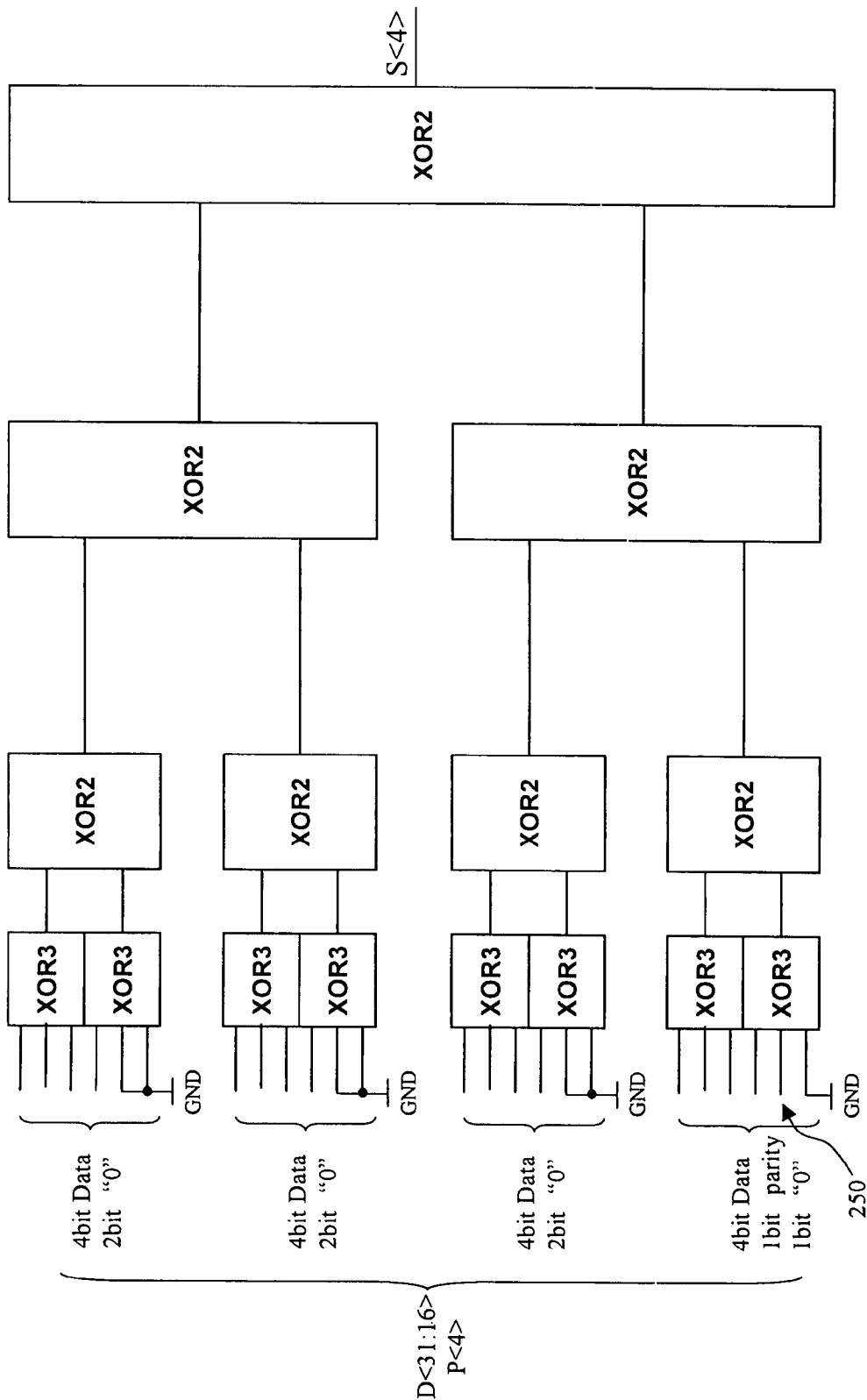
FIG. 18 is syndrome generation circuit in the case of the 16-5 type.

FIG. 18 is a syndrome generation circuit in the case of the 32-6 type. As per FIG. 17, this circuit also comprises eight three-input XOR circuits XOR3 provided on the input side and connected to a 24-bit input terminal; the seven dual-input XOR circuits XOR2 are constituted in three levels and the output of the final-stage dual-input XOR circuit XOR2 is syndrome bit S<4>. Of the 6-bit inputs of the one pair of input-stage XOR3, data are input in four bits and two bits are connected to ground GND to produce logic '0'. That is, of data D<31:0>, 16-bit data D<31:16> are input. In addition, a read parity bit P<4> is input to the input terminal indicated by arrow 250. In other words, the connection of arrow 250 differs from that of FIG. 17.

FIG. 19 is a parity generation circuit in the case of the 16-5 type. This circuit comprises, on the input side, eight three-input XOR circuits XOR3 and is connected to a 24-bit input terminal; the seven dual-input XOR circuits XOR2 are constituted in two levels and the parity bits P<4>-0 and P<4>-1 of two groups are output. Part 260 of the final-stage dual-input XOR circuit XOR2 is not used. Of the 6-bit inputs of the one pair of input-stage XOR3, data are input in four bits and two bits are connected to ground GND to produce logic '0'. Further, among the data D<15:0> of two groups which are separated by a horizontal line in FIG. 19, 8-bit data D<15:8> are input to 10-bit input terminals of the respective groups.

FIG. 20 is a syndrome generation circuit in the case of the 16-5 type. As per FIG. 19, this circuit comprises eight three-input XOR circuits XOR3 on the input side and is connected to a 24-bit input terminal; the six dual-input XOR circuits XOR2 are constituted in two levels and the syndromes bits S<4>-0 and S<4>-1 of two groups are output. Part 280 of the final-stage dual-input XOR circuit XOR2 is not used. Further, at the input terminal, read parity bits P<4>-0 and P<4>-1 are each input to the terminals of arrows 270. The other input terminals are the same as those in FIG. 19.

FIG. 21 shows a parity/syndrome generation circuit P4/S4 capable of switching to two ECC code lengths 32-6 and 16-5. As shown in FIGS. 17 to 19, in the case of each ECC type, switching is required during writing and reading at the input terminals denoted by arrows 250 and 270. Further, a parity bit that is to be input to the input terminal, and a parity bit or syndrome bit that is to be output to the output terminal must be switched in accordance with two ECC types.

FIG. 21 shows switches SW21 and SW22 as the input-side switch group SWin of FIG. 8 and shows switch SW31 as the output-side switch group SWout. The switching of these switches is as follows; by performing such switching, the circuits shown in FIGS. 17 to 19 are implemented.

SW21: during writing, SW21 is connected to GND; during reading, for the 16-5 type, SW21 is connected to parity bit P<4>-0 and, for 32-5, SW21 is connected to GND.

SW22: during writing, SW22 is connected to GND; during reading, for the 16-4 type, SW22 is connected to the parity P<4>-1; for the 32-5 type, SW22 is connected to parity P<4>.

SW31: during both writing and reading, SW31 is connected to either type 16-5 or 32-6. However, during writing, the output is a parity bit P<4> and during reading, the output is a syndrome bit S<4>.

As mentioned earlier, the output terminal has a 2-bit output in the case of the 16-5 type and a 1-bit output in the case of the 32-6 type. The control of these switches is performed by a switching control signal CNT generated in each case in accordance with the execution of writing and reading and in accordance with the ECC code length (16-5 or 32-6). Furthermore, the input from the data bus to the input terminal does not require switching.

Returning now to FIG. 8, the final parity/syndrome circuit P5/S5 will now be described. As shown in FIG. 7, during writing, the parity/syndrome circuit P5/S5 receives an input of 16-bit data D<31:16> among 32-bit data D<L and generates one parity bit P<5>. Further, during reading, the parity/syndrome circuit P5/S5 receives an input of 16-bit data D<31:16> among 32-bit data D<L> and receives an input of a parity bit P<5> that is read, whereby one syndrome bit S<5> is generated.

The parity/syndrome circuit P5/S5 is only used with the 32-6 type and is not required for the 8-4 and 16-5 types. Hence, the switching control signal CNT with respect to the input-side switch group SWin is generated in correspondence with writing and reading. Furthermore, there is no output-side switch group SWout.

Figure 22:
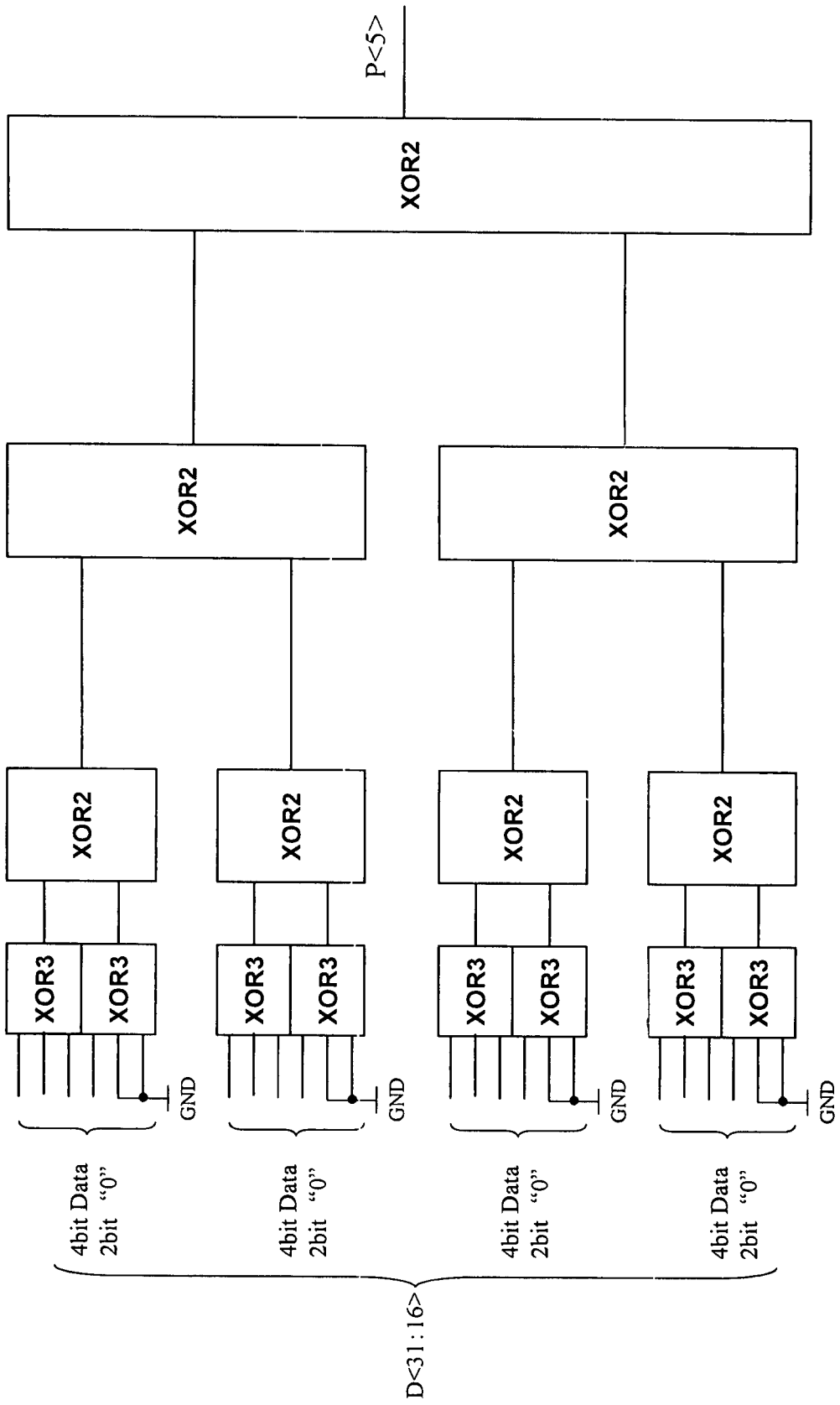
FIG. 22 is a parity generation circuit in the case of the 32-6 type.
Figure 23:
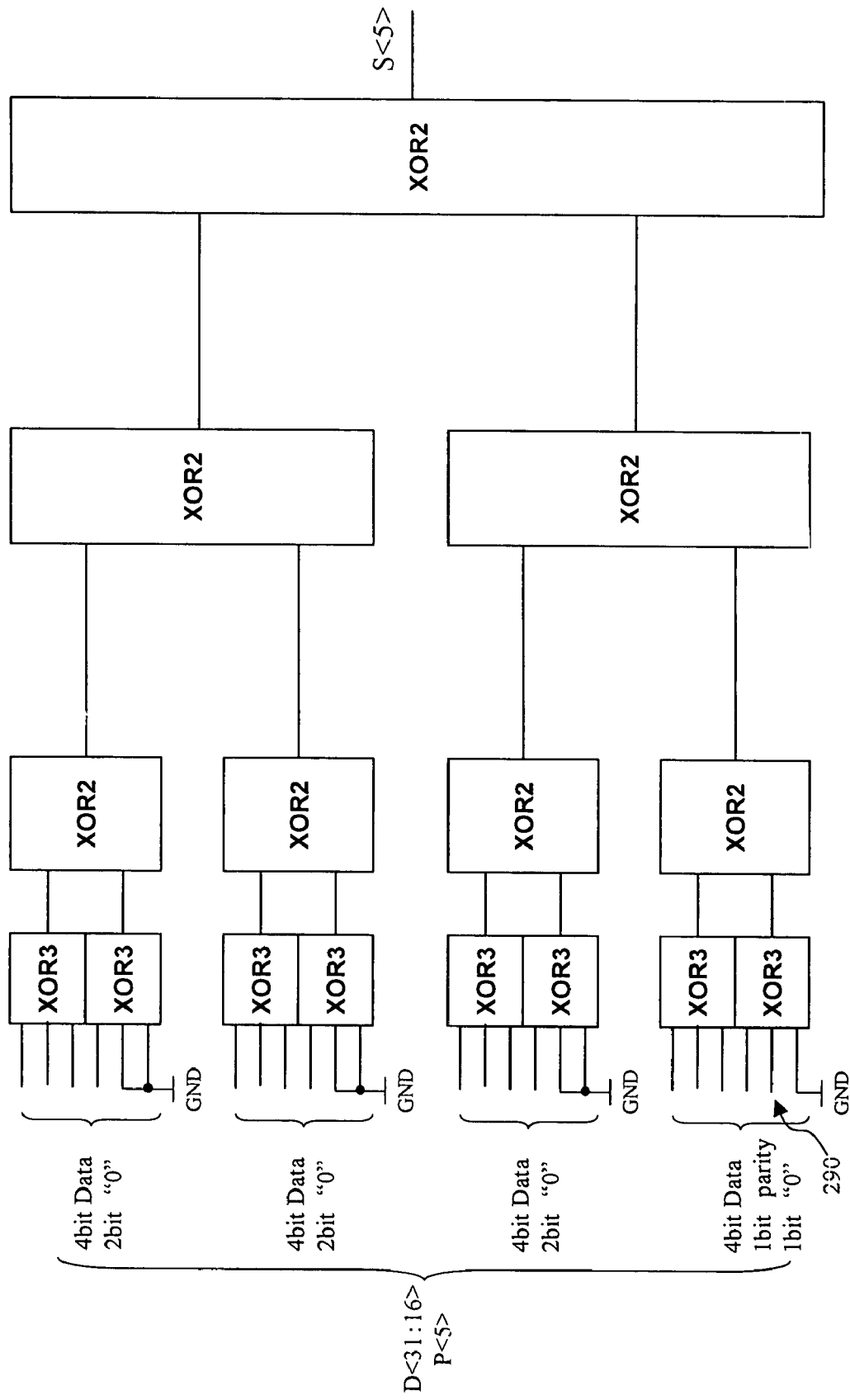
FIG. 23 is a syndrome generation circuit in the case of the 32-6 type.
Figure 24:
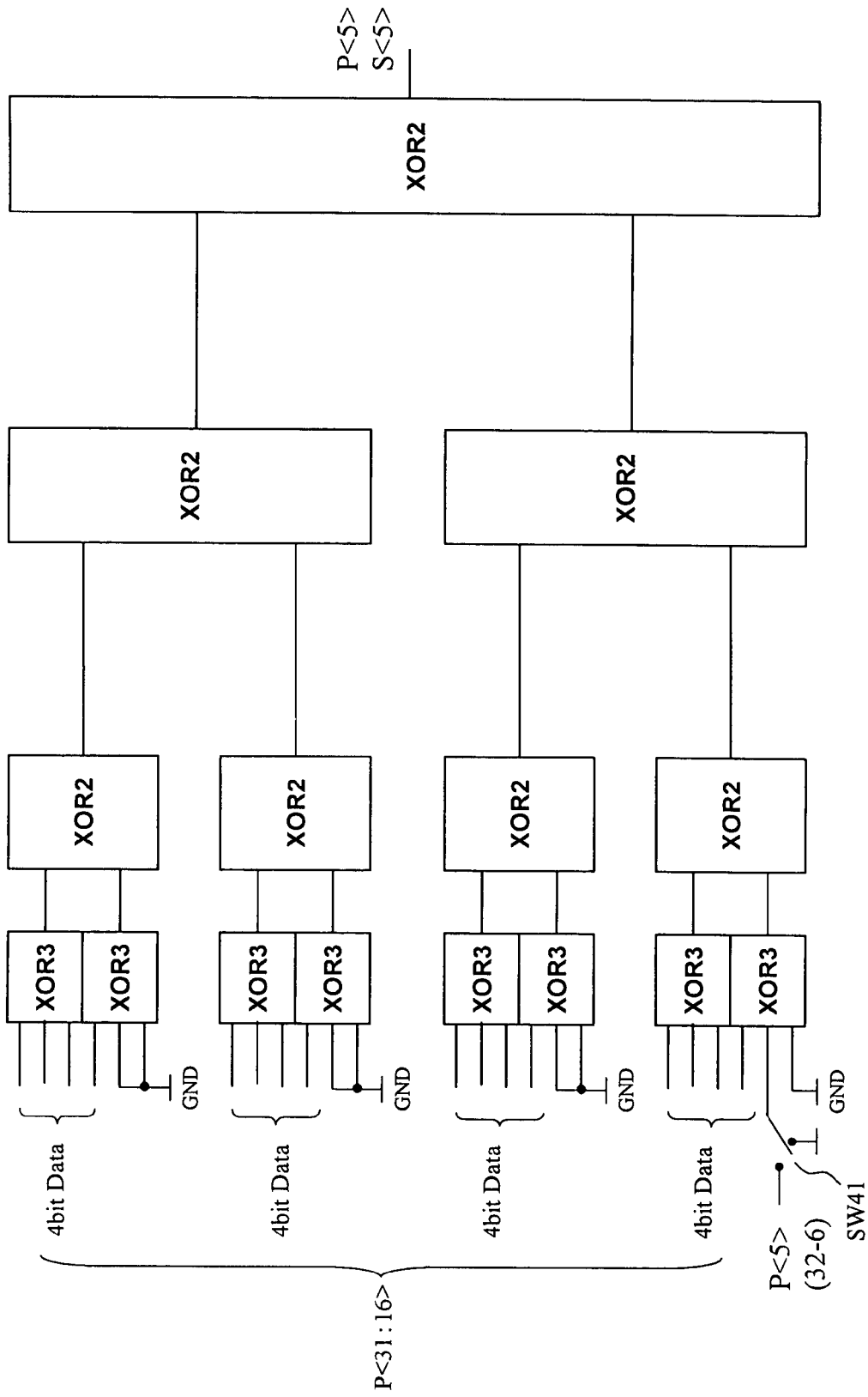
FIG. 24 is a circuit diagram of a parity/syndrome generation circuit P5/S5 in the case of the 32-6 type.

FIGS. 22 to 24 are writing and reading circuit diagrams for the parity/syndrome circuit P5/S5. FIG. 24 includes a switch group that permits switching of these two circuit constitutions.

FIG. 22 is a parity generation circuit of the 32-6 type. This parity generation circuit is constituted by eight three-input XOR circuits XOR3 and seven dual-input XOR circuits XOR2; in the 24-bit input terminal, data D<31:16> are input for 16 bits and the remaining eight bits are connected to ground GND to produce logic '0'.

FIG. 23 is a syndrome generation circuit of the 32-6 type. The XOR circuit constitution is the same as that of FIG. 22 except for the fact that a read parity bit P<5> is input at the input terminal at arrow 290. A syndrome bit S<5> is output to the output terminal.

FIG. 24 is a circuit diagram of the parity/syndrome circuit P5/S5 of the 32-6 type in which a switch SW41 is shown as the input-side switch group SWin. In other words, the switch SW41 is connected to the parity bit P<5> side during reading and to ground GND during writing. As a result, switch SW41 is switched depending on whether reading or writing is executed. A parity bit P<5> is output during reading to the output terminal and a syndrome bit S<5> is output during writing.

Returning now to FIG. 8, the parity/syndrome circuit P0/S0 to P3/S3 correspond to three types of ECC code length and, during reading and writing, switch groups SWin and SWout are switched, whereby the circuit can be switched to six types of circuit. Likewise, the parity/syndrome circuit P4/S4 corresponds to ECC code lengths of two types 32-6 and 16-5 and, during reading and writing, switch groups SWin and SWout are switched, whereby the circuit can be switched to four types of circuit. Further, the parity/syndrome circuit P5/S5 is used in the case of ECC code length 32-6 and, during reading and writing, the switch group SWin is switched, whereby the circuit can be switched to two types of circuit. Furthermore, this switching is performed by means of control signal CNT.

In FIG. 8, in the 32-bit data bus 25D, twenty bits of the combinations shown in parity p0 in FIG. 7 are input to the parity/syndrome circuit P0/S0, twenty bits of the combinations shown in parity p1 are input to the parity/syndrome circuit P1/S1, twenty bits of the combinations shown in parity p2 are input to the parity/syndrome circuit P2/S2, and twenty bits of the combinations shown in parity p3 are input to the parity/syndrome circuit P3/S3. However, the connection to these inputs is fixed irrespective of the three types of ECC code length. Likewise, in the 32-bit data bus 25D, sixteen bits of the combinations shown in parities p4 and p5 in FIG. 7 are input to the parity/syndrome circuits P4/S4 and P5/S5 and the connection to the input is also fixed.

Further, the combination of the read parity bits input to the parity/syndrome circuit is switched in accordance with the type of ECC code length. However, this is performed by means of the input-side switch group SWin. In addition, the parity bit or syndrome bit that is the output of the parity/syndrome circuit is switched in accordance with the ECC code length but this switching is performed by the output-side switch group SWout.

As a result of the connection network NET2 in FIG. 8, among the syndrome bits generated by the respective parity/syndrome circuits P0/S0 to P5/S5, syndrome bit S<5:0> which is obtained through the selection of one bit in the first group is input to the syndrome decoder 2640 and the syndrome bit S<4:0> which is obtained the rough the selection of one bit in the second group is input to the syndrome decoder 2641. Likewise, the syndrome bit S<3:0> which is obtained through the selection of one bit in the third and fourth groups is input to the syndrome decoders 2642 and 2643.

If the ECC code length is of the 32-6 type, only the syndrome decoder 2640 to which the syndrome bit S<5:0> is input operates. If the ECC code length is of the 16-5 type, only the syndrome decodes 2640 and 2641 to which the syndrome bit S<4:0> is input operate. If the ECC code length is of the 8-4 type, the four syndrome decoders to which the syndrome bit S<3:0> is input operate. Accordingly, the switching control signal CNT is supplied to each of the syndrome decoders.

Each of the syndrome decoders 2640 to 2643 compares the syndrome bits thus input with information on the crosses X in the parity check matrix 28 and generates an error correction code EC for which a matching bit is '1' and a mismatching bit is '0'. In the aforementioned example, because there is an error in data D0, EC<7:0>=10000000 is output.

Further, the error correction circuit 266 corrects the data D<31:0> and D<15:0>×2, and D<7:0>×4 on the basis of the error correction code EC. More specifically, the error correction code EC reflects the bit '1'. Further, the corrected data D<31:0>, D<15:0>×2, D<7:0>×4 is output.

FIG. 25 shows a constitutional example of the memory cell array of this embodiment. FIG. 25 shows that the ECC code length is the 32-6 type. As per FIG. 5, the data memory cell array D-MCA contains a 32-bit cell for each word (plane) and the corresponding parity memory cell array P-MCA contains a 5-bit cell for each word (plane). As also described in FIG. 5, the parity memory cell array P-MCA has a 16-bit capacity per word (plane) so as to be compatible with the 8-4 type. Accordingly, in the case of the 32-6 type, unused cells (shaded in FIG. 25) exist.

Therefore, in this embodiment, when defective points FA exist in the parity memory cell array P-MCA, used cell regions can be changed to regions where no defective points exist. In FIG. 25, in the parity memory cell array P-MCA (1), defective points FA exist in the used cell region. However, in the parity memory cell array P-MCA (2), the cells of regions without defective points FA are used. Furthermore, in the parity memory cell array P-MCA (3), used cells are arranged in distributed fashion.

Thus, with respect to this embodiment, in the parity memory cell array P-MCA, in the case of the 32-6 type and 16-5 type, used cell regions and unused cell regions exist. Hence, the cell regions that can be used in correspondence with defective points are desirably selected.

Figure 26A:
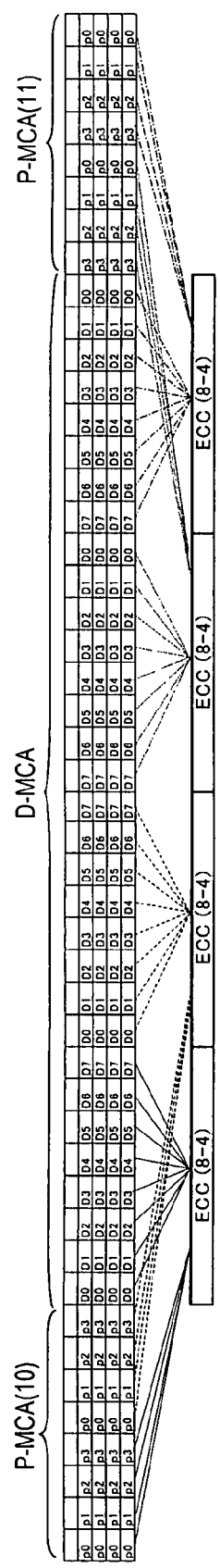
FIG. 26 shows an example of the layout of the memory cell array of this embodiment.
Figure 26B:
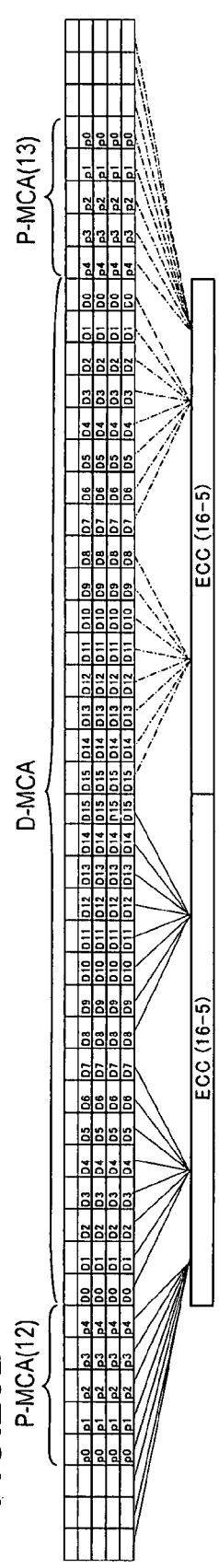
Figure 26C:
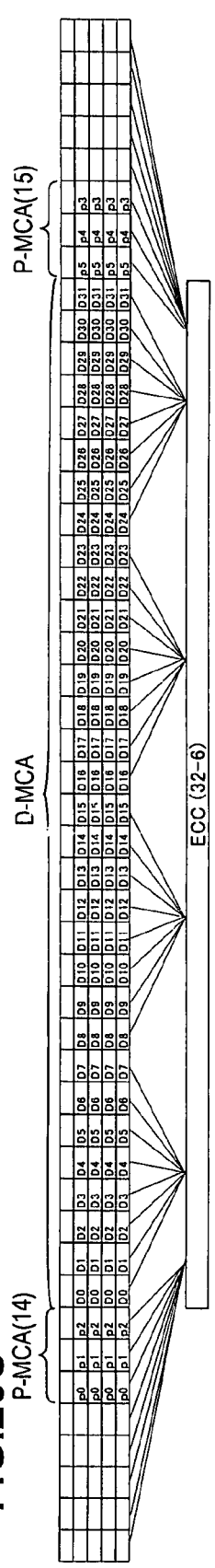

FIG. 26 shows an example of the layout of the memory cell array of this embodiment. FIG. 26 shows the layout of a memory cell array of three types of ECC code length, namely, the 8-4 type, 16-5 type, and 32-6 type. According to this example, a data memory cell array D-MCA in which memory cells of 32 bits per word are disposed at the center of the memory cell array is disposed and a parity memory cell array P-MCA is divided into two and disposed on both sides of the data memory cell array D-MCA. The parity memory cell array P-MCA has memory cells of 16 bits per word arranged evenly on both sides.

The memory cell array in FIG. 26 is such that word lines are disposed to extend in a horizontal direction and bit lines are disposed to extend in a vertical direction. Further, the word line selection circuit not shown is disposed at the center of the data memory cell array. Accordingly, when one word line is selected, data of 32 bits are output from 32 bit lines in the data memory cell array D-MCA. Further, 16-bit, 10-bit, and 6-bit data are output from 16, 10, and 6 bit lines of the parity cell array.

In the case of the 8-4 type, all the memory cells in the parity memory cell array P-MCA (10) and (11) are used. In the case of the 16-5 and 32-6 types, a portion of the memory cells in the parity memory cell array D-MCA are used. Therefore, the layout is such that the parity memory cell arrays P-MCA (12), (13), (14), and (15) that are laterally divided approach the data memory cell array D-MCA in the center and unused memory cell groups are disposed on both sides.

Thus, unused memory cell groups can always be disposed on both sides of the memory cell array. Normally, because the probability of defect generation tends to be high in the peripheral region of the chip, the probability of defective points being used can be reduced by providing the memory cell array with such a layout.

Figure 27:
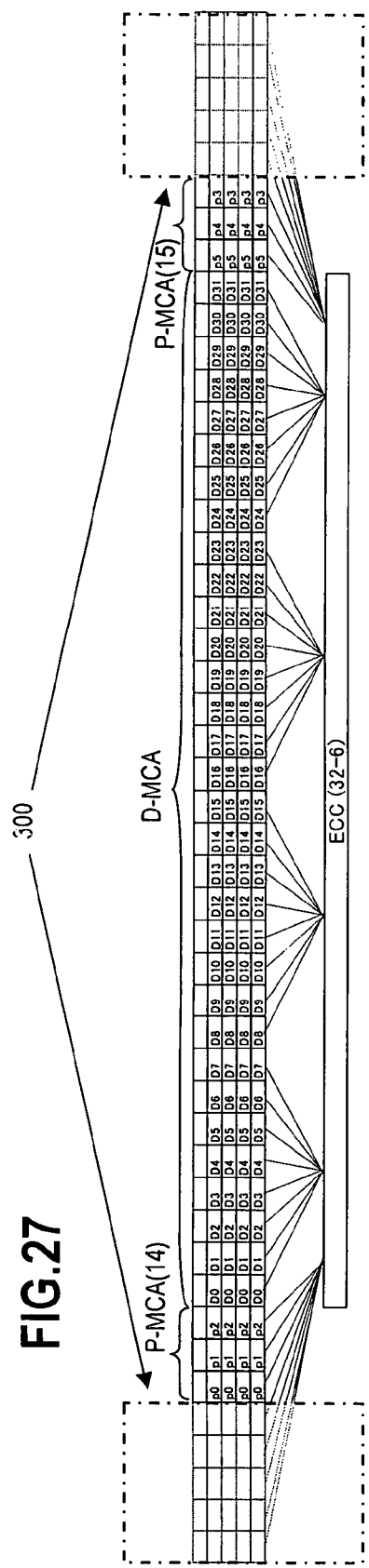
FIG. 27 shows a modified example of the memory cell array of this embodiment.

FIG. 27 shows a modified example of the memory cell array of this embodiment. As illustrated in FIGS. 3A and 3B, when the average defect density gradually drops in accordance with the proficiency of the fabrication line, in cases where the defect density is high, increasing the defect rescue probability by making the ECC code length the 8-4 type results in an overall cost reduction. However, when the defect density is low, reducing the cell array size by shortening the parity bit length with respect to the data length by making the ECC code length the 32-6 type results in a cost reduction.

Therefore, in the case of the 32-6 type memory cell array shown in FIG. 27, the data memory cell array D-MCA is disposed at the center as shown in FIG. 26 and parity memory cell arrays P-MCA (14) and (15) are divided into two and disposed on the left and right of the data memory cell array D-MCA. By removing the unused regions of the regions 300 on both sides from the memory, the size of the memory can be reduced. The memory from which the regions on both sides 300 have been removed has a small chip size or micro size (when the memory is embedded in an ASIC), which can contribute to a reduction in costs.

As illustrated hereinabove, according to the above embodiment, the ECC code length can be suitably changed and, therefore, costs can be reduced by selecting the optimum code length in correspondence with the defect density of the fabrication line.

The switching to adapt to the code length can be performed by providing a fuse ROM in the switching control circuit that generates the switching control signal CNT in FIG. 8 and writing information that corresponds to the code length in the fuse ROM. Alternatively, switching is also possible by means of a mask option. In the case of a fuse format in which shorting occurs as a result of the destruction of the gate oxide film of the MOS transistor, switching is also possible after incorporation in a package.

Furthermore, because switching to adapt to the ECC code length is possible, a defect judgment test can also be performed by switching to the 32-6 type in the test process and, after this test is passed, switching to the 8-4 type before shipping the memory. More specifically, an operation test is performed by switching to the desired type by supplying a signal indicating switching to a particular type in the test process to the switching control circuit in FIG. 8. Thus, because an operation test can be executed in a state where the rescue probability is low, the reliability of the shipped memory can be markedly improved.

In the above embodiment, a one-bit error can be corrected by generating parity bits of I+1 bits for $2^I$ data in accordance with a certain Hamming code. The present invention can also be similarly applied using other Hamming code. For example, the rescue probability can be changed by varying the ECC code length even for Hamming code that allows errors of a plurality of bits, i.e. two or more bits, to be corrected. The present invention can also be applied in cases based on such Hamming code.

Moreover, although the input-side and output-side parity generation circuits and the syndrome generation circuit are constituted by a common XOR circuit in the above embodiment, the aforementioned circuits may also be constituted by individual XOR circuits. In this case, the input-side switch and output-side switch of the respective XOR circuits are switched in accordance with the ECC code length.

What is claimed is:

1. A semiconductor memory device having an error correction function, comprising:
   a data memory cell array which includes a plurality of memory cells and inputs and outputs data of $2^I$ bits (where I is an integer of two or more) with respect to a data bus in response to word selection;
   a parity memory cell array which includes a plurality of memory cells and inputs and outputs parity bits of a number of bits which corresponds to the $2^I$ bit data with respect to a parity bus in response to the word selection;
   a data I/O terminal;
   a parity generation circuit which generates the parity bits from write data of $2^I$ bits which are input from the data I/O terminal and outputs the parity bits to the parity bus;
   a syndrome generation circuit which generates, from the parity bits which are read from the parity memory cell array to the parity bus and read data of $2^I$ bits which are read from the data memory cell array to the data bus, a syndrome bit indicating an error bit position in the read data; and
   an error correction circuit which corrects errors in the read data on the basis of the syndrome bit, wherein
   the parity generation circuit and the syndrome generation circuit are constituted so as to be capable of switching to either a first ECC having $2^I$ bit data and parity bits of I+1 bits or a second ECC having $2^J$ groups of data of $2^{(I-J)}$ bits (where I>J and J is an integer of one or more) and parity bits of I−J+1 bits.

2. The semiconductor memory device according to claim 1, wherein
   the parity generation circuit and the syndrome generation circuit are constituted by a common XOR circuit group,
   the XOR circuit group generates, when switching to the first ECC is performed, parity bits of I+1 bits from $2^I$ bit write data during writing and generates the syndrome bit from read data of $2^I$ bits and read parity bits of I+1 bits during reading; and the XOR circuit group generates, when switching to the second ECC is performed, $2^J$ groups of parity bits of I−J+1 bits from write data of $2^{I-J}$ bits during writing and generates $2^J$ groups of the syndrome bit from read data of $2^{I-J}$ bits and read parity bits of I−J+1 bits during reading; and
   the XOR circuit group comprises an input switch which switches the input of the read parity bits and an output switch which switches the output of the generated parity bits or syndrome bit in response to a switching control signal.

3. The semiconductor memory device according to claim 2, wherein
   the input switch and the output switch of the XOR circuit group are switched in response to a switching control signal which corresponds to the time when writing and reading is performed.

4. The semiconductor memory device according to claim 2, wherein
   the XOR circuit group comprises I+1 XOR circuits which each generate the respective bits of parity bits or syndrome bits of I+1 bits;
   when switching to the first ECC is performed, parity bits or syndrome bits of I+1 XOR circuits; and
   when switching to the second ECC is performed, parity bits or syndrome bits of I−J1 bits are output by the I−J+1 XOR circuits.

5. The semiconductor memory device according to claim 4, wherein
   among the I+1 XOR circuits, I−J+1 XOR circuits input $2^J$ groups of a commonly combinationed data among data of $2^{I-J}$ bits.

6. The semiconductor memory device according to claim 1, wherein
   the parity generation circuit and the syndrome generation circuit are constituted by a common XOR circuit group,
   the XOR circuit group generates, when switching to the first ECC is performed, the XOR of the bits selected among write data of $2^I$ bits as the I+1 bits during writing and generates the XOR of bits selected among read data of $2^I$ bits and the read parity bits as the syndrome bit during reading;
   when switching to the second ECC is performed, the XOR circuit generates as the XOR of bits selected among write data of $2^{I-J}$ bits as $2^J$ groups of parity bits of I−J+1 bits during writing and generates the XOR of bits selected among read data of $2^{I-J}$ bits and the read parity bits as $2^J$ groups of syndrome bit during reading: and
   the XOR circuit group comprises and input switch for switching the input of the read parity bits and an output switch for switching the output of the generated parity bits or the syndrome bit in response to a switching control signal.

7. The semiconductor memory device according to claim 6, wherein
the input switch and the output switch of the XOR circuit group are switched in response to a switching control signal which corresponds to the time when writing and reading is performed.

8. The semiconductor memory device according to claim 6, wherein
the XOR circuit group comprises I+1 XOR circuits which each generate the bits of parity bits or syndrome bits of I+1 bits;
when switching to the first ECC is performed, parity bits or syndrome bits of I+1 bits are output by the I+1 XOR circuits; and
when switching to the second ECC is performed, parity bits or syndrome bits of I−J+1 bits are output by the I−J+1 XOR circuits.

9. The semiconductor memory device according to claim 1, further comprising a switching control section which generates a switching control signal which controls the switching of the parity generation circuit and the syndrome generation circuit, wherein
the switching control signal can be switched to a signal which corresponds with the first ECC or second ECC during testing.

10. The semiconductor memory device according to claim 1, wherein
the parity bits which are input and output with respect to the parity memory cell array in response to the word selection are parity bits of I+1 bits when switching to the first ECC is performed and are parity bits including $2^J$ groups of parity bits of I−J+1 bits when switching to the second ECC is performed.

11. The semiconductor memory device according to claim 10, wherein
the data memory cell array and the parity memory cell array are constituted by the same number of word lines and data and parity bits corresponding with selected word lines are written or read in response to the word line selection.

12. The semiconductor memory device according to claim 10, wherein
the parity memory cell array has a first capacity when switching to the first ECC is performed and a second capacity which is larger than the first capacity when switching to the second ECC is performed.

13. The semiconductor memory device according to claim 12, wherein
the parity memory cell array is disposed at an outer perimeter of the semiconductor memory device; and
when switching to the first ECC is performed, the parity memory cell array occupies a first area and, when switching to the second ECC is performed, the parity memory cell array occupies a second area which is wider than the first area.

14. The semiconductor memory device according to claim 1, wherein
the parity generation circuit and the syndrome generation circuit are also switched to a third ECC which comprises $2^K$ groups of data of $2^{I-K}$ bits (I>K>J, where K is an integer of 1 or more) and parity bits of I−K+1 bits.

15. A semiconductor memory device having an error correction function, comprising:
a data memory cell array which includes a plurality of memory cells and inputs and outputs data of $2^I$ bits (where I is an integer of 2 or more) from and to a data bus in response to word selection;
a parity memory cell array which includes a plurality of memory cells and inputs and outputs parity bits of a number of bits which corresponds to the data of $2^I$ bits from and to a parity bus in response to the word selection;
a data I/O terminal;
an input-side parity generation circuit which generates the parity bits from write data of $2^I$ bits which are input from the data I/O terminal and outputs the parity bits to the parity bus;
an output-side parity generation circuit which generates the parity bits from read data of $2^I$ bits which are read to the data bus from the data memory cell array;
a syndrome generation circuit which generates, from the parity bits generated by the output-side parity generation circuit and the parity bits read from the parity memory cell array to the parity bus, a syndrome bit which indicates an error bit position in the read data; and
an error correction circuit which corrects errors in the read data on the basis of the syndrome bit, wherein
the input-side parity generation circuit, the output-side parity bit generation circuit, and the syndrome generation circuit are constituted sc as to be capable of switching to either a first ECC comprising $2^I$ bit data and parity bits in a number of bits corresponding to this data or a second ECC comprising $2^J$ groups of data of $2^{(I-J)}$ bits (where I>J and J is an integer of one or more) and parity bits in a number of bits corresponding to this data.

16. The semiconductor memory device according to claim 15, wherein
the input-side and output-side parity generation circuits and the syndrome generation circuit are constituted by a common XOR circuit group,
the XOR circuit group generates, when switching to the first ECC is performed, from $2^I$ bit write data, parity bits in a number of bits which corresponds with the $2^I$ bit write data during writing, and generates the syndrome bit from read data of $2^I$ bits and read parity bits corresponding with the read data during reading; and the XOR circuit group generates, when switching to the second ECC is performed, from write data of $2^{I-J}$ bits, $2^J$ groups of parity bits in a number of bits which corresponds with the write data during writing, and generates $2^J$ groups of the syndrome bit from read data of $2^{I-J}$ bits and read parity bits which correspond with the read data during reading; and
the XOR circuit group comprises an input switch which switches the input of the read parity bits in response to a switching control signal.

17. The semiconductor memory device according to claim 16, wherein
the input switch and the output switch of the XOR circuit group are switched in response to a switching control signal which corresponds to the time when writing and reading is performed.

18. The semiconductor memory devi The semiconductor memory device according to claim 16, wherein
the XOR circuit group comprises I+1 XOR circuits which each generate the bits of parity bits or syndrome bits of I+1 bits;
when switching to the first ECC is performed, parity bits or syndrome bits of I+1 bits are output by the I+1 XOR circuits; and
when switching to the second ECC is performed, parity bits or syndrome bits of I−J+1 bits are output by the I−J+1 XOR circuits.

19. The semiconductor memory device according to claim 15, wherein
   the input-side and output-side parity generation circuits and the syndrome generation circuit are constituted by a common XOR circuit group,
   the XOR circuit group generates, when switching to the first ECC is performed, the XOR of the bits selected among write data of $2^I$ bits as the parity bits of I+1 bits during writing and generates the XOR of bits selected among read data of $2^I$ bits and the read parity bits as the syndrome bit during reading;
   when switching to the second ECC is performed, the XOR circuit group generates the XOR of bits selected among write data of $2^{I-J}$ bits as $2^J$ groups of the parity bits of I−J+1 bits during writing and generates the XOR of bits selected among read data of $2^J$ groups of the syndrome bit during reading; and
   the XOR circuit group comprises an input switch for switching the input of the read parity bits and an output switch for switching the output of the generated parity bits or syndrome bit in responde to a switching control signal.

20. The semiconductor memory device according to claim 19, wherein
   the input switch and the output switch of the XOR circuit group are switched in response to switching control signal which corresponds to the time when writing and reading is performed.

21. The semiconductor memory device according to claim 19, wherein
   the XOR circuit group comprises I+1 XOR circuits which each generate the bits of parity bits or syndrome bits of I+1 bits;
   when switching to the first ECC is performed, parity bits or syndrome bits of I +1 bits are output by the I+1 XOR circuits; and
   when switching to the second ECC is performed, parity bits or syndrome bits of I−J+1 bits are output by the I−J+1 XOR circuits.

* * * * *